US005827909A

United States Patent [19]

DesMarais

[11] Patent Number: 5,827,909
[45] Date of Patent: Oct. 27, 1998

[54] RECIRCULATING A PORTION OF HIGH INTERNAL PHASE EMULSIONS PREPARED IN A CONTINUOUS PROCESS

[75] Inventor: Thomas A. DesMarais, Cincinnati, Ohio

[73] Assignee: The Procter & Gamble Company, Cincinnati, Ohio

[21] Appl. No.: 716,510

[22] Filed: Sep. 17, 1996

Related U.S. Application Data

[63] Continuation-in-part of Ser. No. 370,694, Jan. 10, 1995, abandoned.

[51] Int. Cl.[6] .................................. C08J 9/26; C08J 9/28

[52] U.S. Cl. .............................. 523/346; 521/63; 521/64; 521/149; 523/313; 523/343; 523/348; 524/801; 252/314; 366/136

[58] Field of Search ........................... 252/314; 366/136; 521/63, 64, 149; 523/313, 343, 346, 348; 524/801

[56] References Cited

U.S. PATENT DOCUMENTS

| | | | |
|---|---|---|---|
| 3,565,817 | 2/1971 | Lissant | 252/312 |
| 3,734,867 | 5/1973 | Will | 260/2.5 R |
| 3,763,056 | 10/1973 | Will | 260/2.5 L |
| 3,988,508 | 10/1976 | Lissant | 526/344 |
| 4,009,117 | 2/1977 | Newingham et al. | 252/309 |
| 4,018,426 | 4/1977 | Mertz et al. | 259/7 |
| 4,093,570 | 6/1978 | Miyake et al. | 260/2.5 B |
| 4,472,215 | 9/1984 | Binet et al. | 149/109.6 |
| 4,473,611 | 9/1984 | Hag | 428/198 |
| 4,522,953 | 6/1985 | Barby et al. | 521/64 |
| 4,611,914 | 9/1986 | Jones et al. | 521/146 |
| 4,612,334 | 9/1986 | Jones et al. | 521/146 |
| 4,668,709 | 5/1987 | Jones et al. | 521/146 |
| 4,775,655 | 10/1988 | Edwards et al. | 502/416 |
| 4,788,225 | 11/1988 | Edwards et al. | 521/147 |
| 4,797,310 | 1/1989 | Barby et al. | 428/71 |
| 4,844,620 | 7/1989 | Lissant et al. | 366/136 |
| 5,147,134 | 9/1992 | Bradley et al. | 366/150 |
| 5,147,345 | 9/1992 | Young et al. | 604/378 |
| 5,149,720 | 9/1992 | DesMarais et al. | 521/63 |
| 5,189,070 | 2/1993 | Brownscombe et al. | 521/64 |
| 5,198,472 | 3/1993 | DesMarais et al. | 521/63 |
| 5,200,433 | 4/1993 | Beshouri | 521/64 |
| 5,210,104 | 5/1993 | Bass et al. | 521/64 |
| 5,250,576 | 10/1993 | DesMarais et al. | 521/63 |
| 5,252,619 | 10/1993 | Brownscombe et al. | 521/64 |
| 5,260,345 | 11/1993 | DesMarais et al. | 521/148 |
| 5,268,224 | 12/1993 | DesMarais et al. | 428/286 |
| 5,290,820 | 3/1994 | Brownscombe et al. | 521/64 |
| 5,306,734 | 4/1994 | Bass et al. | 521/63 |
| 5,318,554 | 6/1994 | Young et al. | 604/378 |
| 5,331,015 | 7/1994 | DesMarais et al. | 521/62 |
| 5,387,207 | 2/1995 | Dyer et al. | 604/369 |

FOREIGN PATENT DOCUMENTS

| | | | |
|---|---|---|---|
| 0 299 762 | 1/1989 | European Pat. Off. . | |
| 3718818 A1 | 12/1987 | Germany | B29B 7/38 |
| 1 493 356 | 11/1977 | United Kingdom . | |
| 2 194 166 A | 3/1988 | United Kingdom . | |

OTHER PUBLICATIONS

Structure of High–Internal–Phase–Ratio Emulsions, Lissant, Peace, Wu and Mayhan, pp. 416–423, 1973.
A study of Medium and High Internal Phase Ratio Water/Polymer Emulsions, Lissant, pp. 201–208, 1973.
The Geometry of High–Internal–Phase–Ratio Emulsions, Lissant, pp. 462–468, 1966.

*Primary Examiner*—Andrew E. C. Merriam
*Attorney, Agent, or Firm*—Carl J. Roof; E. Kelly Linman; Jacobus C. Rasser

[57] ABSTRACT

An improvement in a continuous process for making high internal phase emulsions that are typically polymerized to provide microporous, open-celled polymeric foam materials capable of absorbing aqueous fluids, especially aqueous body fluids such as urine. The improvement involves recirculating a portion (about 50% or less) of the emulsion withdrawn from the dynamic mixing zone of this continuous process. This increases the uniformity of the emulsion ultimately obtained from this continuous process in terms of having the water droplets homogeneously dispersed in the oil phase. This also improves the stability of the HIPE and expands the temperature range for pouring and curing this HIPE during subsequent emulsion polymerization. The improvement also eliminates the need for a static mixer outside the dynamic mixing zone, and allows for processing where relatively low pressure drops are required across the mixing zone.

39 Claims, 1 Drawing Sheet

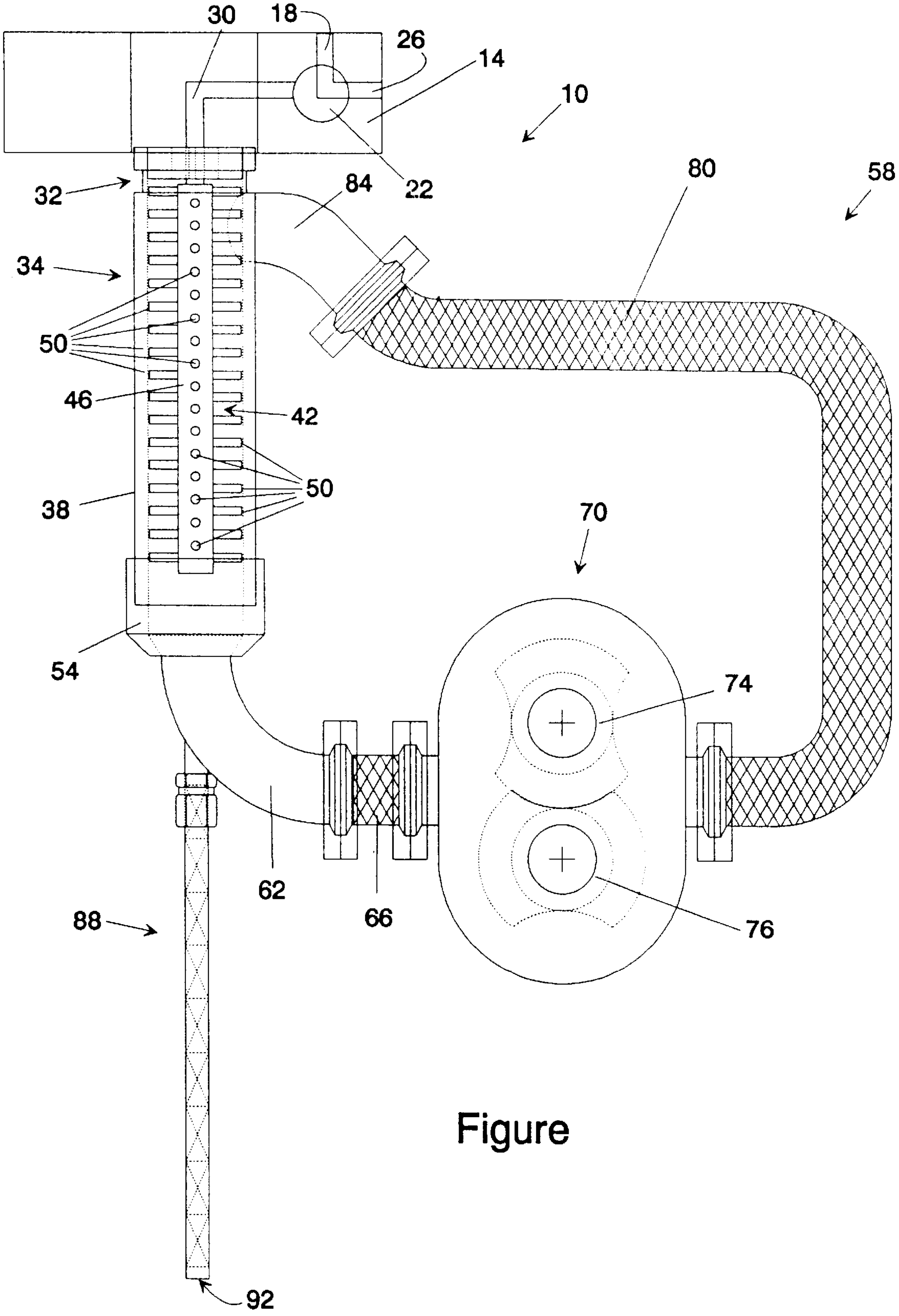
Figure

RECIRCULATING A PORTION OF HIGH INTERNAL PHASE EMULSIONS PREPARED IN A CONTINUOUS PROCESS

This is a continuation-in-part of application Ser. No. 08/370,694, filed on Jan. 10, 1995 now abandoned.

FIELD OF THE INVENTION

This application relates to an improvement in a continuous process for making high internal phase emulsions that are typically polymerized to provide microporous, open-celled polymeric foam materials capable of absorbing aqueous fluids, especially aqueous body fluids such as urine. This application particularly relates to a continuous process for making high internal phase emulsions where a portion of the prepared emulsion is recirculated to improve the uniformity of formation of such emulsions.

BACKGROUND OF THE INVENTION

Water-in-oil emulsions having a relatively high ratio of water phase to oil phase are known in the art as High Internal Phase Emulsions (hereafter referred to as "HIPE" or HIPEs). HIPEs possess radically different properties from emulsions of the low or medium internal phase ratio types. Because of these radically different properties, HIPEs have been used in various applications such as fuels, oil exploration, agricultural sprays, textile printing, foods, household and industrial cleaning, transport of solids, fire extinguishers, and crowd control to name just a few. HIPEs of the water-in-oil emulsion type have found use in several areas such as cosmetics and drugs and in foods such as in dietary products, dressings, and sauces. Water-in-oil HIPEs have also been used in emulsion polymerization to provide porous, polymeric foam-type materials. See, for example, U.S. Pat. No. 3,988,508 (Lissant), issued Oct. 26, 1976; U.S. Pat. No. 5,149,720 (DesMarais et al.), issued Sep. 22, 1992, U.S. Pat. No. 5,260,345 (DesMarais et al.), issued Nov. 9, 1993; and U.S. Pat. No. 5,189,070 (Brownscombe et al.), issued Feb. 23, 1993.

The dispersed droplets present in HIPEs are deformed from the usual spherical shape into polyhedral shapes and are locked in place. For this reason, HIPEs are sometimes referred to as "structured" systems and display unusual rheological properties that are generally attributed to the existence of the polyhedral droplets. For example, when HIPEs are subjected to sufficiently low levels of shear stress, they behave like elastic solids. As the level of shear stress is increased, a point is reached where the polyhedral droplets begin to slide past one another such that the HIPE begins to flow. This point is referred to as the yield value. When such emulsions are subjected to increasingly higher shear stress, they exhibit non-Newtonian behavior, and the effective viscosity decreases rapidly.

The difficulty in preparing HIPEs is in part due to these unusual Theological properties. The internal and external phases of the HIPE are themselves of relatively low viscosity, but as the emulsion is formed, its viscosity becomes very high. When a small amount of low viscosity liquid is added to this high viscosity liquid, it is difficult to incorporate homogeneously with conventional mixing systems. Without appropriate mixing, and as more of the low viscosity liquid is added, the highly viscous phase tends to break up and form a coarse dispersion in the thinner liquid. It is for this reason that HIPEs have been very difficult to prepare.

With the correct type and degree of mixing, however, the low viscosity liquid can be adequately dispersed within the high viscosity liquid as it is added to form a stable emulsion. The original processes for manufacturing HIPEs were discontinuous processes that have economic disadvantages in a commercial production situation. These discontinuous processes typically involve the preparation of a dispersion having a low portion of internal phase and subsequently adding more internal phase until the HIPE contains over 75% internal phase. Such processes are cumbersome, but can be successfully employed using conventional mixing equipment.

Most continuous emulsification equipment used in preparing low- and medium-internal-phase-ratio emulsions is unsuitable for preparing HIPEs. This is because this equipment: (1) does not provide a sufficient deforming force to the structured systems to move the polyhedral droplets past one another and therefore does not accomplish the required mixing; or (2) produces shear rates in excess of the inherent shear stability point. Most importantly, such equipment does not provide adequate mixing, particularly where there is a large disparity in the viscosities of the two phases.

One attempt at developing a continuous process for the production of HIPEs is disclosed in U.S. Pat. No. 3,565,817 (Lissant), issued Feb. 23, 1971 and is directed at achieving sufficient mixing by providing shear rates high enough to reduce the effective viscosity of the emulsified mass to near the viscosities of the less viscous external and internal phases. However, for certain types of emulsions, it is not possible to apply enough shear to effect an apparent viscosity near those of the external and internal phases without going above the shear stability point of the emulsion. Low-fat spread emulsions (margarine) are examples of such emulsions. Although a variety of structurizing elements can achieve shear rates sufficient to reduce the effective viscosity of the emulsion phase to near the external and internal phase viscosities (thereby allowing the phases to be mixed to a certain degree), such elements do not always provide complete mixing, as evidenced by the presence of some non-emulsified liquid in the HIPE.

U.S. Pat. No. 4,844,620 (Lissant et al.), issued Jul. 4, 1989, also discloses a continuous system for preparing HIPEs from internal and external phases having highly disparate viscosities. The internal and external phase ingredients are forced through shearing a device 20 by a recirculating means 18. A recirculation loop 16 is adapted to provide for partial recirculation of the processed phase materials as they exit the shearing device such that the recirculating means draws a major portion of the processed materials through the recirculation loop for additional passes through the system. (The remaining portion of the processed phase materials are continuously propelled from loop 16 as usable HIPE). The reason for recirculation appears to be to provide a preformed emulsion having the desired ratio of internal to external phase materials continuously circulating throughout loop 16. See Col. 3, lines 39, 41. See also U.S. Pat. No. 4,472,215 (Binet et al.), issued Sep. 18, 1984, which discloses a continuous HIPE making process for the manufacture of a water-in-oil explosive emulsion precursor where at least 80%, and up to 95%, by volume of the coarse HIPE is drawn though a recirculation loop by a pump and then returned to be passed again through static mixer.

A continuous process for preparing HIPE useful in emulsion polymerization is disclosed in U.S. Pat. No. 5,149,720 (DesMarais et al.), issued Sep. 22, 1992. In this continuous HIPE process, separate water and oil phase feed streams are introduced into a dynamic mixing zone (typically a pin impeller) and then subjected to sufficient shear agitation in the dynamic mixing zone to at least partially form an emulsified mixture while maintaining steady, non-pulsating flow rates for the oil and water phase streams. The water to oil weight ratio of the feed streams fed to the dynamic mixing zone is steadily increased at a rate that does not break the emulsion in the dynamic mixing zone. The emulsified contents of the dynamic mixing zone are continuously withdrawn and continuously fed into a static mixing zone to be subjected to additional shear agitation suitable for forming a stable HIPE. This HIPE which contains the monomer components in the oil phase is particularly suitable for emulsion polymerization to provide absorbent polymeric foams.

As the oil and water phase streams are combined in this dynamic mixing zone according to U.S. Pat. No. 5,149,720, there is a transition point at the front of this zone where the oil and water streams go from two separate phases to an emulsified phase. As the rate of throughput of the oil and water phase streams through this dynamic mixing zone increases, it has been found that the extent of this transition point also increases. As a result, the water phase is less homogeneously dispersed in the oil phase and the resulting HIPE comprises water droplets that are less uniform in size. This makes the HIPE less stable during subsequent emulsion polymerization, especially if the pour or cure temperatures used are relatively high, e.g., at least about 65° C. The cells formed in the resulting polymeric foam are also less uniform in size.

Accordingly, it would be desirable to be able to make HIPE, and especially HIPE suitable for emulsion polymerization: (1) continuously; (2) with greater uniformity of dispersion of the water phase in the oil phase; (3) at higher throughputs; and (4) with greater ability to pour or cure the HIPE at higher temperatures during emulsion polymerization.

DISCLOSURE OF THE INVENTION

The present invention relates to an improved continuous process for obtaining high internal phase emulsions (HIPEs), and particularly HIPEs useful in making polymeric foams. This process comprises the steps of:

A) providing a liquid oil phase feed stream comprising an effective amount of a water-in-oil emulsifier;

B) providing a liquid water phase feed stream;

C) simultaneously introducing the water and oil phase feed streams into a dynamic mixing zone at flow rates such the initial weight ratio of water phase to oil phase is in the range from about 2:1 to about 10:1;

D) subjecting the combined feed streams in the dynamic mixing zone to sufficient shear agitation to at least partially form an emulsified mixture in the dynamic mixing zone;

E) continuously withdrawing the emulsified mixture from the dynamic mixing zone;

F) recirculating from about 10 to about 50% of the withdrawn emulsified mixture to the dynamic mixing zone;

G) optionally, continuously introducing the remaining withdrawn emulsified mixture into a static mixing zone; and H) continuously withdrawing the stable high internal phase emulsion from the dynamic mixing zone or the optional static mixing zone.

When the oil phase stream comprises one or more monomers capable of forming a polymeric foam, when the water phase stream comprises an aqueous solution containing from about 0.2% to 20% by weight of water-soluble electrolyte and when the oil or water phase stream comprises an effective amount of a polymerization initiator, the resulting stable high internal phase emulsion can be polymerized to form a polymeric foam.

The key improvement in the continuous process of the present invention is the recirculation of a portion of the HIPE formed in the dynamic mixing zone. It is believed that such recirculation modifies the extent of the transition point from separate water and oil phases to HIPE in the dynamic mixing zone. This also improves the uniformity of the emulsion ultimately exiting the dynamic mixer, or the optional static mixer, in terms of having the water droplets homogeneously dispersed in the continuous oil phase. This improves the stability of the HIPE and expands the temperature range for pouring and curing this HIPE during subsequent emulsion polymerization. Recirculation can provide other benefits, including: (a) higher throughput of the HIPE throughout the entire process; and (b) the ability to formulate HIPEs having much higher water to oil phase ratios, e.g., as high as about 250:1. Indeed, HIPEs made by the process of the present can readily achieve very high water to oil phase ratios of from about 150:1 to about 250:1.

Another improvement in the present invention is Applicant's discovery that recirculation of a portion of the HIPE back into the dynamic mixing zone eliminates the need for using any static mixers positioned downstream from the dynamic mixer. This simplifies the equipment and the attendant maintenance, and shortens the path to the collection device.

Applicant has also discovered that by recirculating a portion of the emulsion back to the dynamic mixer, the need for a significant pressure drop across the mixing zone (see, for example, U.S. Pat. No. 4,844,620 to Lissant et al.) is obviated. In fact, the processes of the present invention typically exhibit a pressure drop across the mixing zone of not more than about 50 psi. As used herein, the term "mixing zone" refers to the dynamic mixer and the recirculation zone, and does not include any optional static mixers. As used herein, the term "mixing zone pressure drop" means the drop in pressure across the mixing zone, which is equivalent to the back pressure created by the mixing zone. The terms "total pressure drop" and "system pressure drop" mean the drop in pressure across the entire mixing apparatus (i.e., the dynamic mixer, the recirculation zone, and any optional static mixer(s)). The total pressure drop is equivalent to the back pressure of the entire system. The data contained in the Examples Section is presented as the total pressure drop value, or the back pressure of the entire system. Preferably, the pressure drop across the mixing zone is not more than about 40 psi, and more preferably is from about 0.1 psi to about 30 psi., depending on the type of emulsion desired. Minimizing the system's pressure drop avoids the difficulty in assuring reliable flow rates from the metering pumps providing the water and oil phases to the mixing device. It also makes the design of the seals for the recirculation pump and the dynamic mixer more facile. Methods for calculating incremental pressure drops that result from inclusion of one or more static mixers are well known to the skilled artisan. Thus, if a static mixer that produces a pressure drop of 25 psi is employed, the total system pressure would be not more than about 75 psi, preferably not more than about 65 psi, still more preferably not more than about 55 psi.

While the process of the present invention is particularly desirable for making HIPEs useful in preparing polymeric foams, it is also useful for making other water-in-oil type HIPEs. These include agricultural products such as agricultural sprays, textile processing additives such as textile printing pastes, food products such as salad dressings, creams and margarines, household and industrial cleaning products such as hand cleaners, wax polishes, and silicone polishes, cosmetics such as insect repellent creams, antiperspirant creams, suntan creams, hair creams, cosmetic creams, and acne creams, transportation of solids through pipes, crowd control products, fire extinguishing products, and the like.

BRIEF DESCRIPTION OF THE DRAWING

The FIGURE is side sectional view of the apparatus and equipment for carrying out the process of the present invention.

DETAILED DESCRIPTION OF THE INVENTION

I. Oil Phase and Water Phase Components of HIPE

A. In General

The process of the present invention is useful in preparing certain water-in-oil emulsions having a relatively high ratio of water phase to oil phase and are commonly known in the art as "HIPEs. These HIPEs can be formulated to have a relatively wide range of water-to-oil phase ratios. The particular water-to-oil phase ratio selected will depend on a number of factors, including the particular oil and water phase components present, the particular use to be made of the HIPE, and the particular properties desired for the HIPE. Generally, the ratio of water-to-oil phase in the HIPE is at least about 4:1, and is typically in the range of from about 4:1 to about 250:1, more typically from about 12:1 to about 200:1, and most typically from about 20:1 to about 150:1.

For preferred HIPEs according to the present invention that are subsequently polymerized to provide polymeric foams (hereafter referred to as "HIPE foams"), the relative amounts of the water and oil phases used to form the HIPE are, among many other parameters, important in determining the structural, mechanical and performance properties of the resulting HIPE foams. In particular, the ratio of water to oil phase in the HIPE can influence the density, cell size, and capillarity of the foam, as well as the dimensions of the struts that form the foam. HIPEs according to the present invention used to prepare these foams will generally have water-to-oil phase ratios in the range of from about 12:1 to about 250:1, preferably from about 20:1 to about 200:1, most preferably from about 25:1 to about 150:1.

B. Oil Phase Components

1. The Oil

The oil phase of the HIPE can comprise a variety of oily materials. The particular oily materials selected will frequently depend upon the particular use to be made of the HIPE. By "oily" is meant a material, solid or liquid, but preferably liquid at room temperature that broadly meets the following requirements: (1) is sparingly soluble in water; (2) has a low surface tension; and (3) possesses a characteristic greasy feel to the touch. Additionally, for those situations where the HIPE is to be used in the food, drug, or cosmetic area, the oily material should be cosmetically and pharmaceutically acceptable. Materials contemplated as oily materials for use in making HIPEs according to the present invention can include, for example, various oily compositions comprising straight, branched and/or cyclic paraffins such as mineral oils, petroleums, isoparaffins, squalanes; vegetable oils, animal oils and marine oils such as tung oil, oiticica oil, castor oil, linseed oil, poppyseed oil, soybean oil, cottonseed oil, corn oil, fish oils, walnut oils, pineseed oils, olive oil, coconut oil, palm oil, canola oil, rapeseed oil, sunflower seed oil, safflower oil sesame seed oil, peanut oil and the like; esters of fatty acids or alcohols such as ethyl hexylpalmitate, $C_{16}$ to $C_{18}$ fatty alcohol di-isootanoates, dibutyl phthalate, diethyl maleate, tricresyl phosphate, acrylate or methacrylate esters, and the like; resin oils and wood distillates including the distillates of turpentine, rosin spirits, pine oil, and acetone oil; various petroleum based products such as gasolines, naphthas, gas fuel, lubricating and heavier oils; coal distillates including benzene, toluene, xylene, solvent naphtha creosote oil and anthracene oil and ethereal oils: and silicone oils. Preferably, the oily material is nonpolar.

For preferred HIPEs that are polymerized to form the polymeric foams, this oil phase comprises a monomer component. In the case of HIPE foams suitable for use as absorbents, this monomer component is typically formulated to form a copolymer having a glass transition temperature (Tg) of about 35° C. or lower, and typically from about 15° to about 30° C. (The method for determining Tg by Dynamic Mechanical Analysis (DMA) is described in the TEST METHODS section of copending U.S. application Ser. No. 08/563,866 (Thomas A. DesMarais et al.), filed Nov. 29, 1995, which is incorporated by reference). This monomer component includes: (a) at least one monofunctional monomer whose atactic amorphous polymer has a Tg of about 25° C. or lower; (b) optionally a monofunctional comonomer; and (c) at least one polyfunctional crosslinking agent. Selection of particular types and amounts of monofunctional monomer(s) and comonomer(s) and polyfunctional crosslinking agent(s) can be important to the realization of absorbent HIPE foams having the desired combination of structure, mechanical, and fluid handling properties that render such materials suitable for use as absorbents for aqueous fluids.

For HIPE foams useful as absorbents, the monomer component comprises one or more monomers that tend to impart rubber-like properties to the resulting polymeric foam structure. Such monomers can produce high molecular weight (greater than 10,000) atactic amorphous polymers having Tg's of about 25° C. or lower. Monomers of this type include, for example, monoenes such as the ($C_4$–$C_{14}$) alkyl acrylates such as butyl acrylate, hexyl acrylate, octyl acrylate, 2-ethylhexyl acrylate, nonyl acrylate, decyl acrylate, dodecyl (lauryl) acrylate, isodecyl acrylate tetradecyl acrylate, aryl acrylates and alkaryl acrylates such as benzyl acrylate, nonylphenyl acrylate, the ($C_6$–$C_{16}$) alkyl methacrylates such as hexyl acrylate, octyl methacrylate, nonyl methacrylate, decyl methacrylate, isodecyl methacrylate, dodecyl (lauryl) methacrylate, tetradecyl methacrylate, ($C_4$–$C_{12}$) alkyl styrenes such as p-n-octylstyrene, acrylamides such as N-octadecyl acrylamide, and polyenes such as 2-methyl-1,3-butadiene (isoprene), butadiene, 1,3-pentadiene (piperylene), 1,3-hexadiene, 1,3-heptadiene, 1,3-octadiene, 1,3-nonadiene, 1,3-decadiene, 1,3-undecadiene, 1,3-dodecadiene, 2-methyl-1,3-hexadiene, 6-methyl-1,3-heptadiene, 7-methyl-1,3-octadiene, 1,3,7-octatriene, 1,3,9-decatriene, 1,3,6-octatriene, 2,3-dimethyl-1,3-butadiene, 2-methyl-3-ethyl-1,3-butadiene, 2-methyl-3-propyl-1,3-butadiene, 2-amyl-1,3-butadiene, 2-methyl-1,3-pentadiene, 2,3-dimethyl-1,3-pentadiene, 2-methyl-3-ethyl-1,3-pentadiene, 2-methyl-3-propyl-1,3-pentadiene, 2,6-diethyl-1,3,7-octatriene, 2,7-dimethyl-1,3,7-octatriene, 2,6-dimethyl-1,3,6-octatriene, 2,7-dimethyl-1,3,6-octatriene, 7-methyl-3-methylene-1,6-octadiene (myrcene), 2,6-dimethyl-1,5,7-octatriene (ocimene), 1-methyl-2-vinyl-4,6-hepta-dieny-3,8-nonadienoate, 5-methyl-1,3,6-heptatriene, 2-ethylbutadiene, and mixtures of these monomers. Of these monomers, isodecyl acrylate, n-dodecyl acrylate and 2-ethylhexyl acrylate are the most preferred. The monomer will generally comprise 30 to about 85%, more preferably from about 50 to about 70%, by weight of the monomer component.

For HIPE foams useful as absorbents, the monomer component also typically comprises one or more comonomers that are typically included to modify the Tg properties of the resulting polymeric foam structure, its modulus (strength), and its toughness. These monofunctional comonomer types can include styrene-based comonomers (e.g., styrene and ethyl styrene) or other monomer types such as methyl methacrylate where the related homopolymer is well known as exemplifying toughness. Of these comonomers, styrene, ethyl styrene, and mixtures thereof are particularly preferred for imparting toughness to the resulting polymeric foam structure. These comonomers can comprise up to about 40% of the monomer component and will normally comprise from about 5 to about 40%, preferably from about 10 to about 35%, most preferably from about 15 about 30%, by weight of the monomer component.

For HIPE foams useful as absorbents, this monomer component also includes one or more polyfunctional crosslinking agents. The inclusion of these crosslinking agents tends to increase the Tg of the resultant polymeric foam as well as its strength with a resultant loss of flexibility and resilience. Suitable crosslinking agents include any of those that can be employed in crosslinking rubbery diene monomers, such as divinylbenzenes, divinyltoluenes, divinylxylenes, divinylnaphthalenes divinylalkylbenzenes, divinylphenanthrenes, trivinylbenzenes, divinylbiphenyls, divinyldiphenylmethanes, divinylbenzyls, divinylphenylethers, divinyldiphenylsulfides, divinylfurans, divinylsulfone, divinylsulfide, divinyldimethylsilane, 1,1'-divinylferrocene, 2-vinylbutadiene, maleate, di-, tri-, tetra-, penta- or higher (meth)acrylates and di-, tri-, tetra-, penta- or higher (meth)acrylamides, including ethylene glycol dimethacrylate, neopentyl glycol dimethacrylate, 1,3-butanediol dimethacrylate, 1,4-butanediol dimethacrylate, 1,6-hexanediol dimethacrylate, 2-butenediol dimethacrylate, diethylene glycol dimethacrylate, hydroquinone dimethacrylate, catechol dimethacrylate, resorcinol dimethacrylate, triethylene glycol dimethacrylate, polyethylene glycol dimethacrylate; trimethylolpropane trimethacrylate, pentaerythritol tetramethacrylate, 1,3-butanediol diacrylate, 1,4-butanediol diacrylate, 1,6-hexanediol diacrylate, diethylene glycol diacrylate, hydroquinone diacrylate, catechol diacrylate, resorcinol diacrylate, triethylene glycol diacrylate, polyethylene glycol diacrylate; pentaerythritol tetraacrylate, 2-butenediol diacrylate, tetramethylene diacrylate, trimethyol propane triacrylate, pentaerythritol tetraacrylate, N-methylolacrylamide, 1,2-ethylene bisacrylamide, 1,4-butane bisacrylamide, and mixtures thereof.

The preferred polyfunctional crosslinking agents include divinylbenzene, ethylene glycol dimethacrylate, diethylene glycol dimethacrylate, 1,6-hexanediol dimethacrylate, 2-butenediol dimethacrylate, ethylene glycol diacrylate, diethylene glycol diacrylate, 1,6-hexanediol diacrylate, 2-butenediol diacrylate, trimethylolpropane triacrylate and trimethacrylate, and mixtures thereof. Divinyl benzene is typically available as a mixture with ethyl styrene in proportions of about 55:45. These proportions can be modified so as to enrich the oil phase with one or the other component. Generally, it is advantageous to enrich the mixture with the ethyl styrene component while simultaneously omitting inclusion of styrene from the monomer blend. The preferred ratio of divinyl benzene to ethyl styrene is from about 30:70 to 55:45, most preferably from about 35:65 to about 45:55. The inclusion of higher levels of ethyl styrene imparts the required toughness without increasing the Tg of the resulting copolymer to the degree that styrene does. The cross-linking agent can generally be included in the oil phase of the HIPE in an amount of from about 5 to about 40%, more preferably from about 10 to about 35%, most preferably from about 15 to about 30%, by weight of the monomer component (100% basis).

The major portion of the oil phase of these preferred HIPEs will comprise these monomers, comonomers and crosslinking agents. It is essential that these monomers, comonomers and crosslinking agents be substantially water-insoluble so that they are primarily soluble in the oil phase and not the water phase. Use of such substantially water-insoluble monomers ensures that HIPE of appropriate characteristics and stability will be realized.

It is, of course, highly preferred that the monomers, comonomers and crosslinking agents used herein be of the type such that the resulting polymeric foam is suitably non-toxic and appropriately chemically stable. These monomers, comonomers and cross-linking agents should preferably have little or no toxicity if present at very low residual concentrations during post-polymerization foam processing and/or use.

2. Emulsifier Component

Another essential component of the oil phase is an emulsifier (or emulsifiers) that permits the formation of stable HIPE emulsions. Suitable emulsifiers for use herein can include any of a number of conventional emulsifiers applicable for use in low and mid-internal-phase emulsions. The particular emulsifiers used will depend upon an number of factors, including the particular oily materials present in the oil phase and the particular use to be made of the HIPE. Usually, these emulsifiers are nonionic materials and can have a wide range of HLB values. Examples of some typical emulsifiers include sorbitan esters such as sorbitan laurates (e.g., SPAN® 20), sorbitan palmitates (e.g., SPAN® 40), sorbitan stearates (e.g., SPAN® 60 and SPAN® 65), sorbitan monooleates (e.g., SPAN® 80), sorbitan trioleates (e.g., SPAN® 85), sorbitan sesquioleates (e.g., EMSORB® 2502), and sorbitan isostearates; polyglycerol esters and ethers (e.g., TRIODAN® 20); polyoxyethylene fatty acids, esters and ethers such as polyoxyethylene (2) oleyl ethers, polyethoxylated oleyl alcohols (e.g. BRIJ® 92 and SIMUSOL® 92), etc.; mono-, di-, and triphosphoric esters such as mono-, di-, and triphosphoric esters of oleic acid (e.g., HOSTAPHAT KO3OON), polyoxyethylene sorbitol esters such as polyoxyethylene sorbitol hexastearates (e.g., ATLAS® G-1050), ethylene glycol fatty acid esters, Iglycerol mono-180 stearates (e.g., IMWITOR 78OK), ethers of glycerol and fatty alcohols (e.g., CREMOPHOR WO/A), esters of polyalcohols, synthetic primary alcohol ethylene oxide condensates (e.g., SYNPERONIC A2), mono and diglycerides of fatty acids (e.g., ATMOS® 300), and the like.

For preferred HIPEs that are polymerized to make polymeric foams, the emulsifier can serve other functions besides stabilizing the HIPE. These include the ability to hydrophilize the resulting polymeric foam. The resulting polymeric foam is typically washed and dewatered to remove most of the water and other residual components. This residual emulsifier can, if sufficiently hydrophilic, render the otherwise hydrophobic foam sufficiently wettable so as to be able to absorb aqueous fluids.

For preferred HIPEs that are polymerized to make polymeric foams, suitable emulsifiers can include sorbitan monoesters of branched $C_{16}$–$C_{24}$ fatty acids, linear unsaturated $C_{16}$–$C_{22}$ fatty acids, and linear saturated $C_{12}$–$C_{14}$ fatty acids, such as sorbitan monooleate, sorbitan monomyristate, and sorbitan monoesters derived from coconut fatty acids; diglycerol monoesters of branched $C_{16}$–$C_{24}$ fatty acids, linear unsaturated $C_{16}$–$C_{22}$ fatty acids, or linear saturated $C_{12}$–$C_{14}$ fatty acids, such as diglycerol monooleate (i.e., diglycerol monoesters of C18:1 fatty acids), diglycerol monomyristate, diglycerol monoisostearate, and diglycerol monoesters of coconut fatty acids; diglycerol monoaliphatic ethers of branched $C_{16}$–$C_{24}$ alcohols (e.g. Guerbet alcohols), linear unsaturated $C_{16}$–$C_{22}$ alcohols, and linear saturated $C_{12}$–$C_{14}$ alcohols (e.g., coconut fatty alcohols), and mixtures of these emulsifiers. See U.S. Pat. No. 5,287,207 (Dyer et al.), issued Feb. 7, 1995 (herein incorporated by reference) which describes the composition and preparation suitable polyglycerol ester emulsifiers and U.S. Pat. No. 5,500,451, issued Mar. 19, 1996 to Stephen A. Goldman et al. (which is incorporated by reference herein), which describes the composition and preparation suitable polyglycerol ether emulsifiers. Preferred emulsifiers include sorbitan monolaurate (e.g., SPAN® 20, preferably greater than about 40%, more preferably greater than about 50%, most preferably greater than about 70% sorbitan monolaurate), sorbitan monooleate (e.g., SPAN® 80, preferably greater than about 40%, more preferably greater than about 50%, most preferably greater than about 70% sorbitan monooleate), diglycerol monooleate (e.g., preferably greater than about 40%, more preferably greater than about 50%, most preferably greater than about 70% diglycerol monooleate), diglycerol monoisostearate (e.g., preferably greater than about 40%, more preferably greater than about 50%, most preferably greater than about 70% diglycerol monoisostearate), diglycerol monomyristate (e.g., preferably greater than about 40%, more preferably greater than about 50%, most preferably greater than about 70% sorbitan monomyristate), the cocoyl (e.g., lauryl and myristoyl) ethers of diglycerol, and mixtures thereof.

In addition to these primary emulsifiers, co-emulsifiers can be optionally included in the oil phase. These co-emulsifiers are at least cosoluble with the primary emulsifier in the oil phase. Suitable co-emulsifiers can be zwitterionic types, including the phosphatidyl cholines and phosphatidyl choline-containing compositions such as the lecithins and aliphatic betaines such as lauryl betaine; cationic types, including long chain $C_{12}$–$C_{22}$ dialiphatic, short chain $C_1$–$C_4$ dialiphatic quaternary ammonium salts such as ditallow dimethyl ammonium chloride, bistridecyl dimethyl ammonium chloride, and ditallow dimethyl ammonium methylsulfate, the long chain $C_{12}$–$C_{22}$ dialkoyl(alkenoyl)-2-hydroxyethyl, short chain $C_1$–$C_4$ dialiphatic quaternary ammonium salts such as ditallowoyl-2-hydroxyethyl dimethyl ammonium chloride, the long chain $C_{12}$–$C_{22}$ dialiphatic imidazolinium quaternary ammonium salts such as methyl-1-tallow amido ethyl-2-tallow imidazolinium methylsulfate and methyl-1-oleyl amido ethyl-2-oleyl imidazolinium methylsulfate, the short chain $C_1$–$C_4$ dialiphatic, long chain $C_{12}$–$C_{22}$ monoaliphatic benzyl quaternary ammonium salts such as dimethyl stearyl benzyl ammonium chloride and dimethyl tallow benzyl ammonium chloride, the long chain $C_{12}$–$C_{22}$ dialkoyl(alkenoyl)-2-aminoethyl, short chain $C_1$–$C_4$ monoaliphatic, short chain $C_1$–$C_4$ monohydroxyaliphatic quaternary ammonium salts such as ditallowoyl-2-aminoethyl methyl 2-hydroxypropyl ammonium methyl sulfate and dioleoyl-2-aminoethyl methyl 2-hydroxyethyl ammonium methyl sulfate; anionic types including the dialiphatic esters of sodium sulfosuccinic acid such as the dioctyl ester of sodium sulfosuccinic acid and the bistridecyl ester of sodium sulfosuccinic acid, the amine salts of dodecylbenzene sulfonic acid; and mixtures of these secondary emulsifiers. The preferred secondary emulsifiers are ditallow dimethyl ammonium methyl sulfate and ditallow dimethyl ammonium methyl chloride. When these optional secondary emulsifiers are included in the emulsifier component, it is typically at a weight ratio of primary to secondary emulsifier of from about 50:1 to about 1:4, preferably from about 30:1 to about 2:1.

3. Oil Phase Composition

The oil phase used to form the HIPE according to the process of the present invention can comprise varying ratios of oily materials and emulsifier. The particular ratios selected will depend on a number of factors including the oily materials involved, the emulsifier used, and the use to be made of the HIPE. Generally, the oil phase can comprise from about 50 to about 98% by weight oily materials and from about 2 to about 50% by weight emulsifier. Typically, the oil phase will comprise from about 70 to about 97% by weight of the oily materials and from about 3 to about 30% by weight emulsifier, and more typically from about 85 to about 97% by weight of the oily materials and from about 3 to about 15% by weight emulsifier.

For preferred HIPEs used to make polymeric foams, the oil phase will generally comprise from about 65 to about 98% by weight monomer component and from about 2 to about 35% by weight emulsifier component. Preferably, the oil phase will comprise from about 80 to about 97% by weight monomer component and from about 3 to about 20% by weight emulsifier component. More preferably, the oil phase will comprise from about 90 to about 97% by weight monomer component and from about 3 to about 10% by weight emulsifier component.

In addition to the monomer and emulsifier components, the oil phase of these preferred HIPEs can contain other optional components. One such optional component is an oil soluble polymerization initiator of the general type well known to those skilled in the art, such as described in U.S. Pat. No. 5,290,820 (Bass et al.), issued Mar. 1, 1994, which is incorporated by reference. Another possible optional component is a substantially water insoluble solvent for the monomer and emulsifier components. Use of such a solvent is not preferred, but if employed will generally comprise no more than about 10% by weight of the oil phase.

A preferred optional component is an antioxidant such as a Hindered Amine Light Stabilizer (HALS), such as bis-1,2,2,5,5-pentamethylpiperidinyl) sebacate (Tinuvin 765) or a Hindered Phenolic Stabilizer (HPS) such as Irganox 1076 and t-butylhydroxyquinone. Another preferred optional component is a plasticizer such as dioctyl azelate, dioctyl sebacate or dioctyl adipate. Other optional components include fillers, colorants, fluorescent agents, opacifying agents, chain transfer agents, and the like.

C. Water Phase Components

The internal water phase of the HIPE is generally an aqueous solution containing one or more dissolved components. One essential dissolved component of the water phase is a water-soluble electrolyte. The dissolved electrolyte minimizes the tendency of the components in the oil phase to also dissolve in the water phase. For preferred HIPEs used to make polymeric foams, this is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred HIPE foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, sodium sulfate and magnesium sulfate. For HIPEs that are used to make polymeric foams, calcium chloride is the most preferred for use in the process according to the present invention. Generally the electrolyte will be utilized in the water phase of the HIPE in a concentration in the range of from about 0.2 to about 20% by weight of the water phase. More preferably, the electrolyte will comprise from about 1 to about 10% by weight of the water phase.

For HIPEs used to make polymeric foams, a polymerization initiator is typically included in the HIPE. Such an initiator component can be added to the water phase of the HIPE and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts. The initiator can be present at up to about 20 mole percent based on the total moles of polymerizable monomers in the oil phase. Preferably, the initiator is present in an amount of from about 0.001 to 10 mole percent based on the total moles of polymerizable monomers in the oil phase.

II. Continuous Process for Making HIPE

The continuous process of the present invention for making HIPE includes the following steps: A) introducing the oil phase and water phase feed streams into the dynamic mixing zone (and initially the recirculation zone); B) initially forming the emulsion in the dynamic mixing zone (and the recirculation zone); C) forming HIPE in the dynamic mixing zone; and D) optionally transferring the effluent from the dynamic mixing zone to a static mixing zone. See U.S. Pat. No. 5,149,720 (DesMarais et al.), issued Sep. 22, 1992, which is incorporated by reference. While this description of the continuous process of the present invention will be with reference to making preferred HIPEs useful for obtaining polymeric foams, it should be understood that this process can be used to prepare other water-in-oil type HIPEs by using different oil and water phase components and amounts, by appropriate modification of the process, and the like.

A. Initial Introduction of Oil and Water Phase Feed Streams Into the Dynamic Mixing and Recirculation Zones The oil phase can be prepared in any suitable manner by combining the essential and optional components using conventional techniques. Such a combination of components can be carried out in either continuous or batch-wise fashion using any appropriate order of component addition. The oil phase so prepared will generally be formed and stored in a feed tank, then provided as a liquid feed stream at any desired flow rate. The water phase stream can be prepared and stored in a similar manner.

The liquid streams of both oil and water phases are initially combined by simultaneously introducing these feed streams together into a dynamic mixing zone. During this stage of initial combination of these oil and water phases, the flow rates of the feed streams are set so that the initial weight ratio of water phase to oil phase being introduced into the dynamic mixing zone is well below that of the final weight ratio of the HIPE produced by the process. In particular, flow rates of the oil and water phase liquid streams are set such that the water to oil weight ratio during this initial introduction stage is in the range of from about 2:1 to about 10:1, more preferably from about 2.5:1 to about 5:1. The purpose of combining the oil and water phase streams at these lower water to oil ratios is to permit formation in the dynamic mixing zone of water-in-oil emulsion which is relatively stable and does not readily "break" under the conditions encountered in this zone.

The actual flow rates of the oil and water phase liquid feed streams during this stage of initial introduction into the dynamic mixing zone will vary depending upon the scale of the operation involved. For pilot plant scale operations, the oil phase flow rate during this initial introduction stage can be in the range of from about 0.02 to about 0.35 liter/minute, and the water phase flow rate can be in the range of from about 0.04 to about 2.0 liters/minute. For commercial scale operations, the oil phase flow rate during this initial introduction stage can be in the range of from about 10 to about 25 liters/minute, and the water phase flow rate can be in the range of from about 20 to about 250 liters/minute.

During the initial startup of this process, the dynamic mixing and recirculation zones are filled with oil and water phase liquid before agitation begins. During this filling stage, the displaced headspace gas is vented from the dynamic mixing zone. Before agitation begins, the liquid in these zones is typically in two separate phases, i.e., an oil phase and a water phase. (At lower water to oil ratios, spontaneous emulsification could occur such that there is essentially only one phase.) Once the dynamic mixing zone is filled with liquid, agitation is begun, and the emulsion begins to form in the dynamic mixing zone. At this point, oil and water phase flow rates into the dynamic mixing zone should be set so as to provide a relatively low initial water to oil weight ratio within the range previously described. The recirculation zone should also be set at a rate approximating the sum of the introductory oil and water phase rates as described previously.

B. Initial Emulsion Formation in the Dynamic Mixing Zone

As noted above, the oil and water phase feed streams are initially combined by simultaneous introduction into a dynamic mixing zone (and in the recirculation zone during initial fill up). For the purposes of the present invention, the dynamic mixing zone comprises a containment vessel for liquid components. This vessel is equipped with means for imparting shear agitation to the liquid contents of the vessel. The means for imparting shear agitation should cause agitation or mixing beyond that which arises by virtue of simple flow of liquid material through the vessel.

The means for imparting shear agitation can comprise any apparatus or device that imparts the requisite amount of shear agitation to the liquid contents in the dynamic mixing zone. One suitable type of apparatus for imparting shear agitation is a pin impeller that comprises a cylindrical shaft from which a number of rows (flights) of cylindrical pins extend radially. The number, dimensions, and configuration of the pins on the impeller shaft can vary widely, depending upon the amount of shear agitation that is desired to be imparted to the liquid contents in the dynamic mixing zone. A pin impeller of this type can be mounted within a generally cylindrical mixing vessel which serves as the dynamic mixing zone. The impeller shaft is positioned generally parallel to the direction of liquid flow through the cylindrical vessel. Shear agitation is provided by rotating the impeller shaft at a speed which imparts the requisite degree of shear agitation to the liquid material passing through the vessel. See FIG. 2 of U.S. Pat. No. 5,149,720.

The shear agitation imparted in the dynamic mixing zone is sufficient to form the liquid contents into a water-in-oil emulsion having water to oil phase ratios within the ranges previously set forth. Frequently such shear agitation at this point will typically be in the range from about 5 to about 10,000 sec.$^{-1}$, more typically, from about 10 to 7000 sec.$^{-1}$. The amount of shear agitation need not be constant but can be varied over the time needed to effect such emulsion formation.

In the continuous process described in U.S. Pat. No. 5,149,720, it is taught that it is important that both the oil and water phase flow rates be steady and non-pulsating once agitation begins to avoid sudden or precipitous changes that can cause the emulsion formed in the dynamic mixing zone to break. See Col. 9, lines 31–35. An important advantage of the improved process according to the present invention is that the criticality of steady, non-pulsating flow rates is substantially reduced by using a recirculation zone as described hereafter. Indeed, it has been found that the oil phase flow can be stopped for a period of time, as long as the recirculation rate is sufficient to return enough emulsified oil phase such that the ratio of total oil phase (unemulsified/emulsified) in this recirculating flow to the introduced water phase does not exceed the stabilizing capacity of the emulsifier.

C) HIPE Formation in Dynamic Mixing Zone

After a water-in-oil emulsion having a relatively low water-to-oil ratio is formed in the dynamic mixing zone, the emulsion is converted, along with the additional non-emulsified contents, into HIPE. This is accomplished by altering the relative flow rates of the water and oil phase streams being fed into the dynamic mixing zone. Such an increase in the water-to-oil ratio of the phases can be accomplished by increasing the water phase flow rate, by decreasing the oil phase flow rate or by a combination of these techniques. The water-to-oil ratios to be eventually realized by such an adjustment of the water phase and/or oil phase flow rates will generally be in the range of from about 12:1 to about 250:1, more typically from about 20:1 to 200:1, most typically from about 25:1 to 150:1.

Adjustment of the oil and/or water phase flow rates to increase the water to oil phase ratio being fed to the dynamic mixing zone can begin immediately after initial formation of the emulsion. This will generally occur soon after agitation is begun in the dynamic mixing zone. The length of time taken to increase the water to oil phase ratio to the ultimately desired higher ratio will depend on the scale of the process involved and the magnitude of the eventual water to oil phase ratio to be reached. Frequently the duration of the flow rate adjustment period needed to increase water to oil phase ratios will be in the range of from about 1 to about 5 minutes.

The actual rate of increase of the water-to-oil phase ratio of the streams being fed to the dynamic mixing zone will be dependent upon the particular components of the emulsion being prepared, as well as the scale of the process involved. For any given HIPE formula and process setup, emulsion stability can be controlled by simply monitoring the nature of the effluent from the process to ensure that it comprises material in substantially HIPE form.

Conditions within the dynamic mixing zone during emulsion formation can also affect the nature of the HIPE prepared by this process. One aspect that can impact on the character of the HIPE produced is the temperature of the emulsion components within the dynamic mixing zone. Generally the emulsified contents of the dynamic mixing zone should be maintained at a temperature of from about 5° to about 95° C., more preferably from about 35° to about 90° C., during HIPE formation. An important advantage of the improved process according to the present invention (relative to that described in is that U.S. Pat. No. 5,149,720) is the ability to increase the temperature at which uniform HIPE can be made by a continuous process. This is due to the addition of the recirculation zone (as described below) where a portion of the HIPE from the dynamic mixing zone is recirculated and combined with the oil and water phase streams introduced into the dynamic mixing zone.

Another aspect involves the amount of shear agitation imparted to the contents of the dynamic mixing zone both during and after adjustment of the water and oil phase flow rates. The amount of shear agitation imparted to the emulsified material in the dynamic mixing zone will directly impact on the size of the dispersed water droplets (and ultimately on the size of the cells that make up the polymeric foam). For a given set of emulsion component types and ratios, and for a given combination of flow rates, subjecting the dynamic mixing zone liquid contents to greater amounts of shear agitation will tend to reduce the size of the dispersed water droplets.

Foam cells, and especially cells which are formed by polymerizing a monomer-containing oil phase that surrounds relatively monomer-free water-phase droplets, will frequently be substantially spherical in shape. The size or "diameter" of such substantially spherical cells is thus a commonly utilized parameter for characterizing foams in general as well as for characterizing polymeric foams of the type prepared from the HIPE made by the process of the present invention. Since cells in a given sample of polymeric foam will not necessarily be of approximately the same size, an average cell size (diameter) will often be specified.

A number of techniques are available for determining average cell size in foams. These techniques include mercury porosimetry methods which are well known in the art. The most useful technique, however, for determining cell size in foams involves simple photographic measurement of a foam sample. Such a technique is described in greater detail in U.S. Pat. No. 4,788,225 (Edwards et al.), issued Nov. 29, 1988, which is incorporated by reference.

For purposes of the present invention, the average cell size of foams made by polymerizing this HIPE can be used to quantify the amount of shear agitation imparted to the emulsified contents in the dynamic mixing zone. In particular, after the oil and water phase flow rates have been adjusted to provide the requisite water/oil ratio, the emulsified contents of the dynamic mixing zone should be subjected to shear agitation which is sufficient to eventually form a HIPE that, upon subsequent polymerization, provides a foam having an average cell size of from about 5 to about 200 μm. (upper ranges in line with U.S. Pat. No. 5,550,167) More preferably, such agitation will be that suitable to realize an average cell size in the subsequently formed foam of from about 10 to about 180 μm. This will typically amount to shear agitation of from about 5 to about 10,000 $sec.^{-1}$, more typically, from about 10 to 7000 $sec.^{-1}$.

As with the shear agitation utilized upon initial introduction of the oil and water phases into the dynamic mixing zone, shear agitation to provide HIPE need not be constant during the process. For example, impeller speeds can be increased or decreased during HIPE preparation as desired or required to provide emulsions that can form foams having the particular desired average cell size characteristics described above.

During the adjustment period, recirculation is adjusted to approximate the current rate of total flow of the introductory oil and water phases. Thus, when the targeted oil and water phase flow rates are achieved, about half of the effluent exiting the dynamic mixing zone is withdrawn and passed through the recirculation zone. The flow rate through the recirculation zone can then conveniently be reduced.

D) Transfer of Effluent from Dynamic Mixing Zone to an Optional Static Mixing Zone As indicated, Applicant has discovered that in spite of recirculating only up to about 50% of the HIPE, it is possible to eliminate the static mixers taught by the prior art. Nonetheless, in one embodiment of the process of the present invention, the emulsion-containing liquid contents of the dynamic mixing zone are continuously withdrawn and a portion is introduced into an optional static mixing zone, where they are subjected to further mixing and agitation. The nature and composition of this effluent will, of course, change over time as the process proceeds from initial startup, to initial emulsion formation, to HIPE formation in the dynamic mixing zone, as the water-to-oil phase ratio is increased. During the initial startup procedure, the dynamic mixing zone effluent can contain little or no emulsified material at all. After emulsion formation begins to occur, the effluent from the dynamic mixing zone will comprise a water-in-oil emulsion having a relatively low water-to-oil phase ratio, along with excess oil and water phase material that has not been incorporated into the emulsion. Finally, after the water-to-oil phase ratio of the two feed streams has been increased, the dynamic mixing zone effluent will comprise HIPE.

Once steady state operation is achieved, the flow rate of effluent from the dynamic mixing zone to the optional static mixing zone will equal the sum of the flow rates of the water and oil phases being introduced into the dynamic mixing zone. After water and oil phase flow rates have been properly adjusted to provide formation of the desired HIPE, the effluent flow rate from the dynamic mixing zone will typically be in the range of from about 35 to about 800 liters per minute for commercial scale operations. For pilot plant scale operations, dynamic mixing zone effluent flow rates will typically be in the range of from about 0.8 to about 9.0 liters per minute.

The optional static mixing zone also provides resistance to the flow of liquid material through the process and thus provides back pressure to the liquid contents of the dynamic mixing zone.

For purposes of the present invention, the static mixing zone can comprise any suitable containment vessel for liquid materials. This vessel is internally configured to impart agitation or mixing to such liquid materials as these materials flow through the vessel. A typical static mixer is a spiral mixer that can comprise a tubular device having an internal configuration in the form of a series of helices that reverse direction every 180° of helical twist. Each 180° twist of the internal helical configuration is called a flight. Typically, a static mixer having from 12 to 32 helical flights that intersect at 90° angles will be useful in the present process.

In the optional static mixing zone, shear forces are imparted to the liquid material simply by the effect of the internal configuration of the static mixing device on the liquid as it flows therethrough. Typically such shear is imparted to the liquid contents of the static mixing zone to the extent of from about 5 to about 10,000 $sec.^{-1}$, more typically, from about 10 to 7000 $sec.^{-1}$.

The effluent of the dynamic mixing zone will, after HIPE water/oil phase ratios are achieved, be formed into a stable HIPE. Typically, such HIPEs will have a water-to-oil phase ratio which is in the range of from about 12:1 to about 250:1, more typically from about 20:1 to about 200:1, most typically from about 25:1 to about 150:1. Such emulsions are stable in the sense that they will not significantly separate into their water and oil phases, at least for a period of time sufficient to permit polymerization of the monomers present in the oil phase.

III. Recirculation of Portion of HIPE from Dynamic Mixing Zone

As noted above, a key aspect of the improved continuous process according to the present invention is the addition of a recirculation zone. In this recirculation zone, a portion of the emulsified mixture withdrawn from the dynamic mixing zone is recirculated and then combined with the oil and water phase streams being introduced to the dynamic mixing zone, as described previously. By recirculating a portion of the withdrawn emulsified mixture, the uniformity of the HIPE ultimately exiting the dynamic or optional static mixer is improved, especially in terms of having the water droplets homogeneously dispersed in the continuous oil phase. Recirculation may also allow higher throughput of HIPE through both the dynamic and optional static mixing zones, as well as allow the formulation of HIPEs having higher water to oil phase ratios.

The particular amount of HIPE that is recirculated will depend upon a variety of factors, including the particular components present in the oil and water phases, the rate at which the oil and water phase streams are introduced to the dynamic mixing zone, the rate at which the emulsified mixture is withdrawn from the dynamic mixing zone, whether a static mixer is used, the particular throughput desired through the dynamic mixing zone (and the static mixing zone if present), and like factors. For the purposes of the present invention, s from about 10 to about 50% of the emulsified mixture withdrawn from the dynamic mixing zone is recirculated. In other words, the ratio of the recirculated stream to the combined oil phase and water phase streams introduced to the dynamic mixing zone is from about 0.11:1 to about 1:1. Preferably, from about 15 to about 40% of the emulsified mixture withdrawn from the dynamic mixing zone is recirculated (ratio of recirculated stream to combined oil phase and water phase streams of from about 0.17:1 to about 0.65:1). Most preferably, from about 20 to about 33% of this withdrawn emulsified mixture is recirculated (ratio of recirculated stream to combined oil phase and water phase streams of from about 0.25:1 to about 0.5:1).

The recirculated portion of the withdrawn emulsified mixture is returned to the dynamic mixing zone at a point such that it can be combined with the oil and water phase streams that are being introduced to the dynamic mixing zone. Typically, this recirculated portion of the emulsified mixture (the recirculated stream) is pumped back to a point that is proximate the point where the oil and water phase streams are entering the dynamic mixing zone. The means used to pump this recirculated stream should not induce shear higher than that previously described for the dynamic mixing zone. Indeed, it is typically preferred that this pumping means induce relatively low shear to this recirculated stream.

The volume of emulsified components present in the recirculated stream, relative to the total volume of oil and water phase components present in the dynamic mixing zone, can be important. For example, the recirculated stream volume can affect the degree of stabilization of the emulsion present in the dynamic mixing zone, especially if the rate of introduction of the oil phase stream to the dynamic mixing zone is reduced or stopped as described above.

Conversely, the higher the recirculation stream volume, the less responsive will be the continuous process to changes in the flow rates or HIPE composition. For production systems that are intended to operate for substantial periods of time to make only one particular type of HIPE, a relatively large recirculated stream volume is recommended, i.e., the recirculated stream volume is on the order of from about 2 to about 10 times the total volume of oil and water phase components present in the dynamic mixing zone. For systems that require substantially faster response to changes in the flow rate or HIPE composition, a relatively smaller recirculated stream volume is preferred, i.e., the recirculated stream volume is on the order of from about 0.3 to about 3 times the total volume of oil and water phase components present in the dynamic mixing zone. In addition, if the length of the recirculation zone through which this recirculated stream passes is substantially greater than the length of the dynamic mixing zone, e.g., about twice the length, the inclusion of static mixing elements in the recirculation zone can be desirable. This is particularly important to prevent the build up of the emulsified components on the interior surfaces of conduits, pipes, etc. that are used to convey this recirculated stream through the recirculation zone.

A suitable apparatus for carrying out the improved continuous process of the present invention is shown in the FIGURE and is indicated generally as 10. Apparatus 10 has a shot block indicated generally as 14. The oil phase and water phase streams are fed from tanks (not shown) to block 14. These oil and water phase streams enter through a conduit 18 formed in block 14. A valve indicated generally as 22 controls the flow of these oil and water phase ingredients into either conduit 26 or conduit 30 formed in block 14. Indeed, the relative position of valve 22 determines whether the oil and water phase streams flow out through conduit 26, as is shown in the FIGURE, or else flow into conduit 30. Conduit 30 feeds the oil and liquid phase streams to the head 32 of the dynamic mixing vessel generally indicated as 34. This vessel 34 is fitted with a vent line (not shown) to vent air during the filling of vessel 34 to maintain and all-liquid environment in this vessel.

This dynamic mixing vessel has a hollow cylindrical housing indicated as 38 within which rotates a pin impeller 42. This pin impeller 42 consists of a cylindrical shaft 46 and a number of flights of cylindrical impeller pins 50 protruding radially outwardly from this shaft. These flights of pins 50 are positioned in four rows that run along a portion of the length of shaft 46, the rows being positioned at 90° angles around the circumference of this shaft. The rows of pins 50 are offset along the length of shaft 46 such that flights that are perpendicular to each other are not in the same radial plane extending from the central axis of shaft 46.

A representative impeller 42 can consist of a shaft 46 having a length of about 18 cm and a diameter of about 1.9 cm. This shaft holds four rows of cylindrical pins 50 each having a diameter of 0.5 cm and extending radially outwardly from the central axis of shaft 42 to a length of 1 cm. This impeller 42 is mounted within cylindrical housing 38 such that the pins 50 have a clearance of 0.8 mm from the inner surface thereof. This impeller can be operated at a speed of from about 100 to about 3000 rpm.

Impeller 50 is used to impart shear agitation to the liquid contents present in dynamic mixing vessel 34 to form the emulsified mixture. This emulsified mixture is withdrawn from the dynamic mixing vessel through housing cone 54 in which one end of housing 38 fits. A portion of this withdrawn emulsified mixture is then recirculated through the recirculation zone indicated generally as 58. This recirculation zone has an elbow shaped coupling 62, one end of which fits within housing cone 54 to receive that portion of the emulsified mixture to be recirculated. The other end of coupling 62 is connected to one end of a hose or conduit 66. The other end of hose or conduit 66 is connected to a pumping device generally indicated as 70. A particularly suitable pumping device that imparts low shear to this recirculated stream is a Waukesha Lobe Pump. As shown in the FIGURE, this Waukesha pump has elements 74 and 76 that pump the recirculated stream through the recirculation zone while at the same time imparting only low shear. The other end of pump 70 is connected to one end of a hose or conduit 80. The other end of hose or conduit 80 is connected to one end of coupling 84. The other end of coupling 84 is connected to housing 38 of the dynamic mixing vessel 34 such that the recirculated stream from zone 58 is introduced near the head 30 of this vessel.

The remaining portion of the withdrawn emulsified mixture that is not recirculated is withdrawn from coupling 62 for further processing such as emulsion polymerization. Alternatively, the portion that is not recirculated is optionally subjected to further agitation or mixing in a static mixing vessel indicated as 88. One end of optional static mixing vessel 88 receives that portion of the emulsified mixture exiting dynamic mixing vessel 34 that is not recirculated to recirculation zone 58. One suitable static mixer (14 inches long by ½ inch outside diameter by 0.43 inch inside diameter) is fitted with a helical internal configuration of mixing elements so as to provide back pressure to the dynamic mixing vessel 34. This helps keep vessel 34 full of liquid contents. The HIPE from this static mixer 88 is then withdrawn through end 92 for further processing such as emulsion polymerization.

IV. Polymerizing HIPE to Obtain Polymeric Foams

HIPE can be continuously withdrawn from the static mixing zone at a rate which approaches or equals the sum of the flow rates of the water and oil phase streams fed to the dynamic mixing zone. After the water-to-oil phase ratio of the feed materials has been increased to within the desired HIPE range and steady state conditions have been achieved, the effluent from the static mixing zone will essentially comprise a stable HIPE emulsion suitable for further processing into absorbent foam material. In particular, preferred HIPEs containing a polymerizable monomer component can be converted to polymeric foams. Polymeric foams of this type and especially their use as absorbents in absorbent articles is disclosed in, for example, U.S. Pat. No. 5,268,224 (DesMarais et al.), issued Dec. 7, 1993 and U.S. Pat. No. 5,387,207 (Dyer et al.), issued Feb. 7, 1995, both of which are incorporated by reference.

This HIPE can be converted to a polymeric foam by the following additional steps: A) polymerizing/curing the HIPE under conditions suitable for forming a solid polymeric foam structure; B) optionally washing the polymeric foam to remove the original residual water phase therefrom and, if necessary, treating the foam with a hydrophilizing surfactant and/or hydratable salt to deposit any needed hydrophilizing surfactant/hydratable salt, and C) thereafter dewatering this polymeric foam.

A. Polymerization/Curing of the HIPE

The formed HIPE will generally be collected or poured in a suitable reaction vessel, container or region to be polymerized or cured. In one embodiment, the reaction vessel comprises a tub constructed of polyethylene from which the eventually polymerized-cured solid foam material can be easily removed for further processing after polymerization/curing has been carried out to the extent desired. It is usually preferred that the temperature at which the HIPE is poured into the vessel be approximately the same as the polymerization/curing temperature.

Suitable polymerization/curing conditions will vary depending upon the monomer and other makeup of the oil and water phases of the emulsion (especially the emulsifier systems used), and the type and amounts of polymerization initiators used. Frequently, however, suitable polymerization/curing conditions will involve maintaining the HIPE at elevated temperatures above about 30° C., more preferably above about 35° C., for a time period ranging from about 2 to about 64 hours, more preferably from about 4 to about 48 hours. The HIPE can also be cured in stages such as described in U.S. Pat. No. 5,189,070 (Brownscombe et al.), issued Feb. 23, 1993, which is herein incorporated by reference.

When more robust emulsifier systems such as diglycerol monooleate, diglycerol isostearate or sorbitan monooleate are used in these HIPEs, the polymerization/curing conditions can be carried out at more elevated temperatures of about 50° C. or higher, more preferably about 60° C. or higher. Typically, the HIPE can be polymerized/cured at a temperature of from about 60° to about 99° C., more typically from about 65° to about 95° C.

A porous water-filled open-celled HIPE foam is typically obtained after polymerization/curing in a reaction vessel, such as a tub. This polymerized HIPE foam is typically cut or sliced into a sheet-like form. Sheets of polymerized HIPE foam are easier to process during subsequent treating/washing and dewatering steps, as well as to prepare the HIPE foam for use in absorbent articles. The polymerized HIPE foam is typically cut/sliced to provide a cut thickness in the range of from about 0.08 to about 2.5 cm. During subsequent dewatering, this can lead to collapsed HIPE foams having a thickness in the range of from about 0.008 to about 1.25 cm.

B. Treating/Washing HIPE Foam

The solid polymerized HIPE foam formed will generally be filled with residual water phase material used to prepare the HIPE. This residual water phase material (generally an aqueous solution of electrolyte and other residual components such as emulsifier) should be at least partially removed prior to further processing and use of the foam. Removal of this original water phase material will usually be carried out by compressing the foam structure to squeeze out residual liquid and/or by washing the foam structure with water or other aqueous washing solutions. Frequently several compressing and washing steps, e.g., from 2 to 4 cycles, will be used.

After the original water phase material has been removed to the extent required, the HIPE foam, if needed, can be treated, e.g., by continued washing, with an aqueous solution of a suitable hydrophilizing surfactant and/or hydratable salt. When these foams are to be used as absorbents for aqueous fluids such as juice spills, milk and the like for clean up and/or bodily fluids such as urine and/or menses, they generally require further treatment to render the foam relatively more hydrophilic. Hydrophilization of the foam, if necessary, can generally be accomplished by treating the HIPE foam with a hydrophilizing surfactant.

These hydrophilizing surfactants can be any material that enhances the water wettability of the polymeric foam surface. They are well known in the art, and can include a variety of surfactants, preferably of the nonionic type. They will generally be liquid form, and can be dissolved or dispersed in a hydrophilizing solution that is applied to the HIPE foam surface. In this manner, hydrophilizing surfactants can be adsorbed by the preferred HIPE foams in amounts suitable for rendering the surfaces thereof substantially hydrophilic, but without substantially impairing the desired flexibility and compression deflection characteristics of the foam. Such surfactants can include all of those previously described for use as the oil phase emulsifier for the HPE, such as diglycerol monooleate, sorbitan monooleate and diglycerol monoisostearate. In preferred foams, the hydrophilizing surfactant is incorporated such that residual amounts of the agent that remain in the foam structure are in the range from about 0.5% to about 15%, preferably from about 0.5 to about 6%, by weight of the foam.

Another material that needs to be incorporated into the HIPE foam structure is a hydratable, and preferably hygroscopic or deliquescent, water soluble inorganic salt. Such salts include, for example, toxicologically acceptable alkaline earth metal salts. Salts of this type and their use with oil-soluble surfactants as the foam hydrophilizing surfactant is described in greater detail in U.S. Pat. No. 5,352,711 (DesMarais), issued Oct. 4, 1994, the disclosure of which is incorporated by reference. Preferred salts of this type include the calcium halides such as calcium chloride. (As previously noted, these salts can also be employed as the water phase electrolyte in forming the HIPE).

Hydratable inorganic salts can easily be incorporated by treating the foams with aqueous solutions of such salts. These salt solutions can generally be used to treat the foams after completion of, or as part of, the process of removing the residual water phase from the just-polymerized foams. Treatment of foams with such solutions preferably deposits hydratable inorganic salts such as calcium chloride in residual amounts of at least about 0.1% by weight of the foam, and typically in the range of from about 0.1 to about 12%.

Treatment of these relatively hydrophobic foams with hydrophilizing surfactants (with or without hydratable salts) will typically be carried out to the extent necessary to impart suitable hydrophilicity to the foam. Some foams of the preferred HIPE type, however, are suitably hydrophilic as prepared, and can have incorporated therein sufficient amounts of hydratable salts, thus requiring no additional treatment with hydrophilizing surfactants or hydratable salts. In particular, such preferred HIPE foams include those where certain oil phase emulsifiers previously described and calcium chloride are used in the HIPE. In those instances, the internal polymerized foam surfaces will be suitably hydrophilic, and will include residual water-phase liquid containing or depositing sufficient amounts of calcium chloride, even after the polymeric foams have been dewatered.

C. Foam Dewatering

After the HIPE foam has been treated/washed, it will generally be dewatered. Dewatering can be achieved by compressing the foam to squeeze out residual water, by subjecting the foam, or the water therein, to temperatures of from about 60° to about 200° C., or to microwave treatment, by vacuum dewatering or by a combination of compression and thermal drying/microwave/vacuum dewatering techniques. The dewatering step will generally be carried out until the HIPE foam is ready for use and is as dry as practicable. Frequently such compression dewatered foams will have a water (moisture) content of from about 50 to about 500%, more preferably from about 50 to about 200%, by weight on a dry weight basis. Subsequently, the compressed foams can be thermally dried to a moisture content of from about 5 to about 40%, more preferably from about 5 to about 15%, on a dry weight basis.

V. Uses of Polymeric Foams Made by Improved Continuous Process

A. In General

Polymeric foams made according to the improved continuous process of the present invention are broadly useful in a variety of products. For example, these foams can be employed as environmental waste oil sorbents; as absorbent components in bandages or dressings; to apply paint to various surfaces; in dust mop heads; in wet mop heads; in dispensers of fluids; in packaging; in odor/moisture sorbents; in cushions; and for many other uses.

B. Absorbent Articles

Polymeric foams made according to the improved continuous process of the present invention are particularly useful as absorbent members for various absorbent articles. See copending U.S. application Ser. No. 08/563,866 (Thomas A. DesMarais et al.), filed Nov. 29, 1996, copending U.S. application Ser. No. 08/370,695 (Keith J. Stone et al.), filed Jan. 10, 1995, and U.S. Pat. No. 5,550,167 (Thomas A. DesMarais, et al.), issued Aug. 27, 1996 (all of which are incorporated by reference herein), which disclose the use of these absorbent foams as absorbent members in absorbent articles. By “absorbent article” is meant a consumer product that is capable of absorbing significant quantities of urine or other fluids (i.e., liquids), like aqueous fecal matter (runny bowel movements), discharged by an incontinent wearer or user of the article. Examples of such absorbent articles include disposable diapers, incontinence garments, catamenials such as tampons and sanitary napkins, disposable training pants, bed pads, and the like. The absorbent foam structures herein are particularly suitable for use in articles such as diapers, incontinence pads or garments, clothing shields, and the like.

In its simplest form, such absorbent articles need only include a backing sheet, typically relatively liquid-impervious, and one or more absorbent foam structures associated with this backing sheet. The absorbent foam structure and the backing sheet will be associated in such a manner that the absorbent foam structure is situated between the backing sheet and the fluid discharge region of the wearer of the absorbent article. Liquid impervious backing sheets can comprise any material, for example polyethylene or polypropylene, having a thickness of about 1.5 mils (0.038 mm), which will help retain fluid within the absorbent article.

More conventionally, these absorbent articles will also include a liquid-pervious topsheet element that covers the side of the absorbent article that touches the skin of the wearer. In this configuration, the article includes an absorbent core comprising one or more absorbent foam structures positioned between the backing sheet and the topsheet. Liquid-pervious topsheets can comprise any material such as polyester, polyolefin, rayon and the like that is substantially porous and permits body fluid to readily pass there through and into the underlying absorbent core. The topsheet material will preferably have no propensity for holding aqueous fluids in the area of contact between the topsheet and the wearer’s skin.

VI. Specific Examples

Example 1: Preparation of HIPE and Foams from a HIPE Wherein No Static Mixer is Employed

A) HIPE Preparation

Anhydrous calcium chloride (36.32 kg) and potassium persulfate (189 g) are dissolved in 378 liters of water. This provides the water phase stream to be used in a continuous process for forming a HIPE emulsion.

To a monomer combination comprising distilled divinylbenzene (42.4% divinylbenzene and 57.6% ethyl styrene) (1980 g), 2-ethylhexyl acrylate (3300 g), and hexanedioldiacrylate (720 g) is added a diglycerol monooleate emulsifier (360 g), ditallow dimethyl ammonium methyl sulfate (60 g), and Tinuvin 765 (30 g). The diglycerol monooleate emulsifier (Grindsted Products; Brabrand, Denmark) comprises approximately 81% diglycerol monooleate, 1% other diglycerol monoesters, 3% polyols, and 15% other polyglycerol esters, imparts a minimum oil/water interfacial tension value of approximately 2.7 dyne/cm and has an oil/water critical aggregation concentration of approximately 2.8 wt %. After mixing, this combination of materials is allowed to settle overnight. No visible residue is formed and all of the mixture is withdrawn and used as the oil phase in a continuous process for forming a HIPE emulsion.

Separate streams of the oil phase (25° C.) and water phase (53°–55° C.) are fed to a dynamic mixing apparatus. Thorough mixing of the combined streams in the dynamic mixing apparatus is achieved by means of a pin impeller. The pin impeller comprises a cylindrical shaft of about 21.6 cm in length with a diameter of about 1.9 cm. The shaft holds 6 rows of pins, 3 rows having 33 pins and 3 rows having 32 pins, each having a diameter of 0.3 cm extending outwardly from the central axis of the shaft to a length of 1.6 cm. The pin impeller is mounted in a cylindrical sleeve which forms the dynamic mixing apparatus, and the pins have a clearance of 0.8 mm from the walls of the cylindrical sleeve.

A minor portion of the effluent exiting the dynamic mixing apparatus is withdrawn and enters a recirculation zone, as shown in the FIGURE. The Waukesha pump in the recirculation zone returns the minor portion to the entry point of the oil and water phase flow streams to the dynamic mixing zone.

The combined mixing and recirculation apparatus set-up is filled with oil phase and water phase at a ratio of 3 parts water to 1 part oil. The dynamic mixing apparatus is vented to allow air to escape while filling the apparatus completely. The flow rates during filling are 1.89 g/sec oil phase and 7.56 cc/sec water phase.

Once the apparatus set-up is filled, the water phase flow rate is cut to 5.68 cc/sec to reduce the pressure build up while the vent is closed. Agitation is then begun in the dynamic mixer, with the impeller turning at 1770 RPM and recirculation is begun at a rate of about 8 cc/sec. The flow rate of the water phase is then steadily increased to a rate of 45.4 cc/sec over a time period of about 1 min., and the oil phase flow rate is reduced to 0.757 g/sec over a time period of about 3 min. The recirculation rate is steadily increased to about 45 cc/sec during the latter time period. The back pressure created by the dynamic mixer at this point is about 4.7 psi (32.4 kPa), which represents the mixing zone back pressure. (As there is no static mixer, this also represents the total back pressure of the system.) The Waukesha pump speed is then steadily decreased to a yield a recirculation rate of about 23 cc/sec.

B) Polymerization of HIPE

The HIPE flowing from the dynamic mixing zone that is not recirculated is collected in a round polypropylene tub, 17 in. (43 cm) in diameter and 7.5 in (10 cm) high, with a concentric insert made of Celcon plastic. The insert is 5 in (12.7 cm) in diameter at its base and 4.75 in (12 cm) in diameter at its top and is 6.75 in (17.1 cm) high. The HIPE-containing tubs are kept in a room maintained at 65° C. for 18 hours to bring about polymerization and form the foam.

C) Foam Washing and Dewatering

The cured HIPE foam is removed from the curing tubs. The foam at this point has residual water phase (containing dissolved emulsifiers, electrolyte, initiator residues, and initiator) about 50–60 times (50–60×) the weight of polymerized monomers. The foam is sliced with a sharp reciprocating saw blade into sheets which are 0.160 inches (0.406 cm) in thickness. These sheets are then subjected to compression in a series of 2 porous nip rolls equipped with vacuum which gradually reduce the residual water phase content of the foam to about 6 times (6×) the weight of the polymerized material. At this point, the sheets are then resaturated with a 1.5% $CaCl_2$ solution at 60° C., are squeezed in a series of 3 porous nip rolls equipped with vacuum to a water phase content of about 4×. The $CaCl_2$ content of the foam is between 8 and 10%.

The foam remains compressed after the final nip at a thickness of about 0.021 in. (0.053 cm). The foam is then dried in air for about 16 hours. Such drying reduces the moisture content to about 9–17% by weight of polymerized material. At this point, the foam sheets are very drapeable. In this collapsed state, the density of the foam is about 0.14 g/cc.

Example 2: Preparation of HIPE and Foams from a HIPE Wherein a Static Mixer is Employed A) HIPE Preparation Anhydrous calcium chloride (36.32 kg) and potassium persulfate (189 g) are dissolved in 378 liters of water. This provides the water phase stream to be used in a continuous process for forming a HIPE emulsion.

To a monomer combination comprising distilled divinylbenzene (42.4% divinylbenzene and 57.6% ethyl styrene) (1980 g), 2-ethylhexyl acrylate (3300 g), and hexanedioldiacrylate (720 g) is added a diglycerol monooleate emulsifier (360 g), ditallow dimethyl ammonium methyl sulfate (60 g), and Tinuvin 765 (30 g). The diglycerol monooleate emulsifier (Grindsted Products; Brabrand, Denmark) comprises approximately 81% diglycerol monooleate, 1% other diglycerol monoesters, 3% polyols, and 15% other polyglycerol esters, imparts a minimum oil/water interfacial tension value of approximately 2.7 dyne/cm and has an oil/water critical aggregation concentration of approximately 2.8 wt %. After mixing, this combination of materials is allowed to settle overnight. No visible residue is formed and all of the mixture is withdrawn and used as the oil phase in a continuous process for forming a HIPE emulsion.

Separate streams of the oil phase (25° C.) and water phase (53°–55° C.) are fed to a dynamic mixing apparatus. Thorough mixing of the combined streams in the dynamic mixing apparatus is achieved by means of a pin impeller. The pin impeller comprises a cylindrical shaft of about 21.6 cm in length with a diameter of about 1.9 cm. The shaft holds 6 rows of pins, 3 rows having 33 pins and 3 rows having 32 pins, each having a diameter of 0.3 cm extending outwardly from the central axis of the shaft to a length of 1.6 cm. The pin impeller is mounted in a cylindrical sleeve which forms the dynamic mixing apparatus, and the pins have a clearance of 0.8 mm from the walls of the cylindrical sleeve.

A minor portion of the effluent exiting the dynamic mixing apparatus is withdrawn and enters a recirculation zone, as shown in the FIGURE. The Waukesha pump in the recirculation zone returns the minor portion to the entry point of the oil and water phase flow streams to the dynamic mixing zone.

A spiral static mixer is mounted downstream from the dynamic mixing apparatus to provide back pressure in the dynamic mixing apparatus. The static mixer (TAH Industries Model 070-821, modified by cutting off 2.4 inches (6.1 cm) of its original length) is 14 inches (35.6 cm) long with a 0.5 inch (1.3 cm) outside diameter.

The combined mixing and recirculation apparatus set-up is filled with oil phase and water phase at a ratio of 3 parts water to 1 part oil. The dynamic mixing apparatus is vented to allow air to escape while filling the apparatus completely. The flow rates during filling are 1.89 g/sec oil phase and 7.56 cc/sec water phase.

Once the apparatus set-up is filled, the water phase flow rate is cut to 5.68 cc/sec to reduce the pressure build up while the vent is closed. Agitation is then begun in the dynamic mixer, with the impeller turning at 1770 RPM and recirculation is begun at a rate of about 8 cc/sec. The flow rate of the water phase is then steadily increased to a rate of 45.4 cc/sec over a time period of about 1 min., and the oil phase flow rate is reduced to 0.757 g/sec over a time period of about 3 min. The recirculation rate is steadily increased to about 45 cc/sec during the latter time period. The back pressure created by the mixing zone and static mixer at this point is about 14.2 psi (98 kPa), which represents the total pressure drop of the system. The Waukesha pump speed is then steadily decreased to a yield a recirculation rate of about 23 cc/sec.

B) Polymerization of HIPE

The HIPE flowing from the static mixer at this point is collected in a round polypropylene tub, 17 in. (43 cm) in diameter and 7.5 in (10 cm) high, with a concentric insert made of Celcon plastic. The insert is 5 in (12.7 cm) in diameter at its base and 4.75 in (12 cm) in diameter at its top and is 6.75 in (17.1 cm) high. The HIPE-containing tubs are kept in a room maintained at 65° C. for 18 hours to bring about polymerization and form the foam.

C) Foam Washing and Dewatering

The cured HIPE foam is removed from the curing tubs. The foam at this point has residual water phase (containing dissolved emulsifiers, electrolyte, initiator residues, and initiator) about 50–60 times (50–60×) the weight of polymerized monomers. The foam is sliced with a sharp reciprocating saw blade into sheets which are 0.160 inches (0.406 cm) in thickness. These sheets are then subjected to compression in a series of 2 porous nip rolls equipped with vacuum which gradually reduce the residual water phase content of the foam to about 6 times (6×) the weight of the polymerized material. At this point, the sheets are then resaturated with a 1.5% $CaCl_2$ solution at 60° C., are squeezed in a series of 3 porous nip rolls equipped with vacuum to a water phase content of about 4×. The $CaCl_2$ content of the foam is between 8 and 10%.

The foam remains compressed after the final nip at a thickness of about 0.021 in. (0.053 cm). The foam is then dried in air for about 16 hours. Such drying reduces the moisture content to about 9–17% by weight of polymerized material. At this point, the foam sheets are very drapeable. In this collapsed state, the density of the foam is about 0.14 g/cc.

No differences in properties are observed in the polymerized foams of Examples 1 and 2, demonstrating that the static mixing device can be eliminated.

Example 3: Preparation of HIPEs Under Various Operating Conditions

HIPEs are continuously prepared from oil phase stream consisting of a monomer component having 40% divinylbenzene (50% purity) and 60% 2-ethylhexyl acrylate to which is added diglycerol monooleate (6% by weight of the monomers) and Tinuvin 765 (0.5% by weight of the monomers). These HIPEs are prepared with the apparatus shown in the FIGURE, wherein a static mixer is employed, using the operating conditions shown in Table 1 below:

TABLE 1

| Run | W/O Ratio | Impeller (RPM) | Temperature (°F.) | Back Pressure* (psi) | Recirculation Rate |
|---|---|---|---|---|---|
| A | 75 | 1800 | 130 | 9.8 | 3 |
| B | 90 | 1800 | 130 | 9.4 | 3 |
| C | 90 | 1200 | 130 | 6.7 | 3 |
| D | 100 | 1000 | 130 | 5.1 | 3 |
| E | 100 | 800 | 150 | 3.6 | 3 |
| F | 120 | 700 | 150 | 3.6 | 3 |
| G | 120 | 700 | 166 | 3.5 | 3 |
| H | 140 | 700 | 166 | 3.7 | 3 |

*Back pressure represents the total back pressure of the system, including the static mixer.

Example 4: Preparation of HIPEs Under Various Operating Conditions

HIPEs are continuously prepared from oil phase stream consisting of a monomer component having 35% divinylbenzene (40% purity), 55% 2-ethylhexyl acrylate and 10% hexanediol diacrylate to which is added diglycerol monooleate (5% by weight of the monomers), ditallow dimethyl ammonium methyl sulfate (1% by weight of the monomers) and Tinuvin 765 (0.5% by weight of the monomers). These HIPEs are prepared with the apparatus shown in the FIGURE, wherein a static mixer is utilized, using the operating conditions shown in Table 2 below:

TABLE 2

| Run | W/O Ratio | Impeller (RPM) | Temperature (°F.) | Back Pressure* (psi) | Recirculation Rate |
|---|---|---|---|---|---|
| A | 60 | 1800 | 130 | 10 | 6 |
| B | 60 | 1800 | 130 | 9.6 | 3 |
| C | 60 | 1800 | 130 | 9.6 | 1.5 |
| D | 60 | 1800 | 130 | 5 | 0 |
| E | 85 | 1500 | 130 | 5.8 | 3 |

*Back pressure represents the total back pressure of the system, including the static mixer.

What is claimed is:

1. A continuous process for the preparation of a high internal phase emulsion, which process comprises:

A) providing a liquid oil phase feed stream comprising an effective amount of a water-in-oil emulsifier;

B) providing a liquid water phase feed stream;

C) simultaneously introducing the liquid feed streams into a dynamic mixing zone at flow rates such that the initial weight ratio of water phase to oil phase is in the range from about 2:1 to about 10:1;

D) subjecting the combined feed streams in said dynamic mixing zone to sufficient shear agitation to at least partially form an emulsified mixture in said dynamic mixing zone;

E) continuously withdrawing the emulsified mixture from said dynamic mixing zone;

F) recirculating from about 10 to about 50% of the withdrawn emulsified mixture to said dynamic mixing zone prior to step (D);

G) subjecting the recirculated emulsion in the dynamic mixing zone to sufficient shear mixing to completely form a stable high internal phase emulsion having a water to oil phase weight ratio of at least about 4:1; and H) continuously withdrawing from the dynamic mixing zone the portion of the stable high internal phase emulsion that is not recirculated in step (F);

wherein at any time subsequent to step D), the flow rate of the oil phase stream, the water phase stream, or both may be altered to modify the weight ratio of water phase to oil phase.

2. The process of claim 1 wherein the water to oil phase weight ratio in step G) is in the range of from about 12:1 to about 200:1.

3. The process of claim 2 wherein the water to oil phase weight ratio in step G) is in the range of from about 20:1 to about 150:1.

4. The process of claim 2 wherein the oil phase comprises from about 50 to about 98% by weight oily materials and from about 2 to about 50% by weight emulsifier.

5. The process of claim 4 wherein the oil phase comprises from about 70 to about 97% by weight oily materials and from about 3 to about 30% by weight emulsifier.

6. The process of claim 1 wherein from about 15 to about 40% of the withdrawn emulsified mixture of step F) is recirculated to said dynamic mixing zone.

7. The process of claim 6 wherein from about 20 to about 33% of the withdrawn emulsified mixture of step F) is recirculated to said dynamic mixing zone.

8. The process of claim 1 wherein the process exhibits a mixing zone pressure drop of not more than about 50 psi.

9. The process of claim 8 wherein the process exhibits a mixing zone pressure drop of not more than about 40 psi.

10. The process of claim 9 wherein the process exhibits a mixing zone pressure drop of not more than about 30 psi.

11. The process of claim 1 wherein:

1) the oil phase stream of step (A) comprises:
   a) from about 65 to about 98% by weight of a monomer component capable of forming a polymer foam; and
   b) from about 2 to about 35% by weight of an emulsifier component which is soluble in the oil phase and which is suitable for forming a stable water-in-oil emulsion;
2) the water phase stream of step (B) comprises an aqueous solution containing from about 0.2% to 20% by weight of water-soluble electrolyte;
3) one of the oil phase and water phase streams comprises an effective amount of a polymerization initiator; and
4) the weight ratio of the water phase to the oil phase is in the range of from about 12:1 to about 250:1.

12. The process of claim 11 wherein the weight ratio of the water phase to the oil phase is in the range of from about 25:1 to about 200:1.

13. The process of claim 12 wherein the oil phase comprises from about 80 to about 97% by weight monomer component and from about 3 to about 20% by weight emulsifier component.

14. The process of claim 13 wherein the oil phase comprises from about 90 to about 97% by weight monomer component and from about 3 to about 10% by weight emulsifier component.

15. The process of claim 14 wherein the monomer component comprises:

i) from about 30 to about 85% by weight of at least one substantially water-insoluble monomer capable of forming an atactic amorphous polymer having a Tg of about 25° C. or lower;
ii) from 0 to about 40% by weight of at least one substantially water-insoluble monofunctional comonomer; and
iii) from about 5 to about 40% by weight of at least one substantially water-insoluble, polyfunctional crosslinking agent.

16. The process of claim 15 wherein the monomer component comprises:

i) from about 50 to about 70% by weight of a monomer selected from the group consisting of butyl acrylate, hexyl acrylate, octyl acrylate, 2-ethylhexyl acrylate, nonyl acrylate, decyl acrylate, dodecyl acrylate, isodecyl acrylate tetradecyl acrylate, hexyl acrylate, octyl methacrylate, nonyl methacrylate, decyl methacrylate, isodecyl methacrylate, dodecyl methacrylate, tetradecyl methacrylate, p-n-octylstyrene, isoprene, 1,3-butadiene, 1,3-hexadiene, 1,3-heptadiene, 1,3-octadiene, 1,3-nonadiene, 1,3-decadiene, 1,3-undecadiene, 1,3-dodecadiene, 2-methyl-1,3-hexadiene, 6-methyl-1,3-heptadiene, 7-methyl-1,3-octadiene, 1,3,7-octadiene, 1,3,9-decatriene, 1,3,6-octatriene, 2,3-dimethyl-1,3-butadiene, 2-amyl-1,3-butadiene, 2-methyl-1,3-pentadiene, 2,3-dimethyl-1,3-pentadiene, 2-methyl-3-ethyl-1,3-pentadiene, 2-methyl-3-propyl-1,3-pentadiene, 2,6-dimethyl-1,3,7-octatriene, 2,7-dimethyl-1,3,7-octatriene, 2,6-dimethyl-1,3,6-octatriene, 2,7-methyl-1,3,6-octatriene, 7-methyl-3-methylene-1,6-octadiene, 2,6-dimethyl-1,5,7-octatriene, 1-methyl-2-vinyl-4,6-hepta-dieny-3,8-nonadienoate, 5-methyl-1,3,6-heptatriene, 2-ethylbutadiene, and mixtures thereof;
ii) from about 5 to about 40% by weight of a comonomer selected from the group consisting of styrene, ethyl styrene, methyl methacrylate, and mixtures thereof; and
iii) from about 10 to about 30% by weight of a crosslinking agent selected from the group consisting of divinylbenzenes, divinyltoluenes, divinylxylenes, divinylnaphthalenes divinylethylbenzenes, divinylphenanthrenes, trivinylbenzenes, divinylbiphenyls, divinyldiphenylmethanes, divinylbenzyls, divinylphenylethers, divinyldiphenylsulfides, divinylfurans, divinylsulfone, divinylsulfide, divinyldimethylsilane, 1,1'-divinylferrocene, 2-vinylbutadiene, ethylene glycol dimethacrylate, neopentyl glycol dimethacrylate, 1,3-butanediol dimethacrylate, diethylene glycol dimethacrylate, hydroquinone dimethacrylate, catechol dimethacrylate, resorcinol dimethacrylate, triethylene glycol dimethacrylate, polyethylene glycol dimethacrylate, trimethylolpropane trimethacrylate, pentaerythritol tetramethacrylate, 1,4-butanediol dimethacrylate, 1,6-hexanediol diacrylate, 1,4-butanediol diacrylate, tetramethylene diacrylate, trimethylolpropane triacrylate, pentaerythritol tetraacrylate, N-methylolacrylamide, N-methylolmethacrylamide, 1,2-ethylene bisacrylamide, 1,4-butane bisacrylamide, and mixtures thereof.

17. The process of claim 11 which comprises the further step of polymerizing the monomer component in the oil phase of the emulsion withdrawn from said dynamic mixing zone to form a polymeric foam material.

18. The process of claim 17 which comprises the further step of dewatering the polymeric foam material to an extent such that a collapsed, polymeric foam material is formed that will re-expand upon contact with aqueous fluids.

19. A continuous process for the preparation of a high internal phase emulsion, which process comprises:

A) providing a liquid oil phase feed stream comprising an effective amount of a water-in-oil emulsifier;
B) providing a liquid water phase feed stream;
C) simultaneously introducing the liquid feed streams into a dynamic mixing zone at flow rates such the initial weight ratio of water phase to oil phase is in the range from about 2:1 to about 10:1;
D) subjecting the combined feed streams in said dynamic mixing zone to sufficient shear agitation to at least partially form an emulsified mixture in said dynamic mixing zone;
E) continuously withdrawing the emulsified mixture from said dynamic mixing zone;
F) recirculating from about 10 to about 50% of the withdrawn emulsified mixture to said dynamic mixing zone prior to step (D);
G) continuously introducing the remaining withdrawn emulsified mixture into a static mixing zone wherein the remaining emulsified mixture is further subjected to sufficient shear mixing to completely form a stable high internal phase emulsion having a water to oil phase weight ratio of at least about 4:1; and
H) continuously withdrawing from the dynamic mixing zone the portion of the stable high internal phase emulsion that is not recirculated in step (F);

wherein at any time subsequent to step D), the flow rate of the oil phase stream, the water phase stream, or both may be altered to modify the weight ratio of water phase to oil phase.

20. The process of claim 19 wherein the process exhibits a mixing zone pressure drop of not more than about 50 psi.

21. The process of claim 20 wherein the process exhibits a mixing zone pressure drop of not more than about 40 psi.

22. The process of claim 21 wherein the process exhibits a mixing zone pressure drop of not more than about 30 psi.

23. The process of claim 19 wherein the water to oil phase weight ratio in step G) is in the range of from about 12:1 to about 200:1.

24. The process of claim 19 wherein the oil phase comprises from about 50 to about 98% by weight oily materials and from about 2 to about 50% by weight emulsifier.

25. The process of claim 19 wherein from about 15 to about 40% of the withdrawn emulsified mixture of step F) is recirculated to said dynamic mixing zone.

26. The process of claim 25 wherein from about 20 to about 33% of the withdrawn emulsified mixture of step F) is recirculated to said dynamic mixing zone.

27. The process of claim 19 wherein:

1) the oil phase stream of step (A) comprises:
   a) from about 65 to about 98% by weight of a monomer component capable of forming a polymer foam; and
   b) from about 2 to about 35% by weight of an emulsifier component which is soluble in the oil phase and which is suitable for forming a stable water-in-oil emulsion;
2) the water phase stream of step (B) comprises an aqueous solution containing from about 0.2% to 20% by weight of water-soluble electrolyte;
3) one of the oil phase and water phase streams comprises an effective amount of a polymerization initiator; and
4) the weight ratio of the water phase to the oil phase is in the range of from about 12:1 to about 250:1.

28. The process of claim 27 wherein the oil phase comprises from about 80 to about 97% by weight monomer component and from about 3 to about 20% by weight emulsifier component.

29. The process of claim 28 wherein the monomer component comprises:

i) from about 30 to about 85% by weight of at least one substantially water-insoluble monomer capable of forming an atactic amorphous polymer having a Tg of about 25° C. or lower;
ii) from 0 to about 40% by weight of at least one substantially water-insoluble monofunctional comonomer, and
iii) from about 5 to about 40% by weight of at least one substantially water-insoluble, polyfunctional crosslinking agent.

30. A continuous process for the preparation of a high internal phase emulsion capable of forming a polymeric foam material, which process comprises:

A) providing a liquid oil phase feed stream comprising:
   1) from about 80 to about 97% by weight of a monomer component capable of forming a polymer having a Tg of about 35° C. or lower and comprising:
      a) from about 50 to about 70% by weight of a monomer selected from the group consisting of isodecyl acrylate, n-dodecyl acrylate and 2-ethylhexyl acrylate, and mixtures thereof:
      b) from about 15 to about 30% by weight of the comonomer selected from the group consisting of styrene, ethyl styrene and mixtures thereof; and
      c) from about 15 to about 25% by weight of a crosslinking agent selected from the group consisting of divinyl benzene, ethylene glycol dimethacrylate, diethylene glycol dimethacrylate, 1,6-hexanediol diacrylate, 2-butenediol dimethacrylate, ethylene glycol diacrylate, trimethylolpropane triacrylate and trimethacrylate, and mixtures thereof; and
   2) from about 3 to about 20% by weight of an emulsifier component comprising an emulsifier selected from the group consisting of sorbitan monoesters of branched $C_{16}$–$C_{24}$ fatty acids, linear unsaturated $C_{16}$–$C_{22}$ fatty acids, and linear saturated $C_{12}$–$C_{14}$ fatty acids; diglycerol monoesters of branched $C_{16}$–$C_{24}$ fatty acids, linear unsaturated $C_{16}$–$C_{22}$ fatty acids, and linear saturated $C_{12}$–$C_{14}$ fatty acids; diglycerol monoaliphatic ethers of branched $C_{16}$–$C_{24}$ alcohols, linear unsaturated $C_{16}$–$C_{22}$ alcohols, and linear saturated $C_{12}$–$C_{14}$ alcohols; and mixtures thereof
B) providing a liquid water phase feed stream comprising an aqueous solution containing from about 0.2% to 20% by weight of water-soluble electrolyte and an effective amount of a polymerization initiator;
C) simultaneously introducing the liquid feed streams into a dynamic mixing zone at flow rates such the initial weight ratio of water phase to oil phase is in the range from about 2.5:1 to about 5:1;
D) subjecting the combined feed streams in said dynamic mixing zone to sufficient shear agitation to at least partially form an emulsified mixture in said dynamic mixing zone;
E) continuously withdrawing the emulsified mixture from said dynamic mixing zone;
F) recirculating from about 15 to about 40% of the withdrawn emulsified mixture to said dynamic mixing zone prior to step (D);
G) subjecting the recirculated emulsion in the dynamic mixing zone to sufficient shear mixing to completely form a stable high internal phase emulsion having a water to oil phase weight ratio of from about 12:1 to about 250:1; and
H) continuously withdrawing from the dynamic mixing zone the portion of the stable high internal phase emulsion that is not recirculated in step (F);

wherein at any time subsequent to step D) the flow rate of the oil phase stream the water phase stream, or both may be altered to modify the weight ratio of water phase to oil phase.

31. The process of claim 30 wherein the emulsified contents of said dynamic mixing zone are maintained at a temperature of from about 5° to about 95° C. during step D).

32. The process of claim 30 wherein the weight ratio of the water phase to the oil phase is in the range of from about 25:1 to about 200:1.

33. The process of claim 32 wherein the oil phase comprises from about 90 to about 97% by weight monomer component and from about 3 to about 10% by weight emulsifier component.

34. The process of claim 32 wherein from about 20 to about 33% of the withdrawn emulsified mixture of step F) is recirculated to said dynamic mixing zone.

35. The process of claim 30 which comprises the further step of polymerizing the monomer component in the oil phase of the emulsion withdrawn from said dynamic mixing zone to form a polymeric foam material.

36. The process of claim 35 which comprises the further step of dewatering the polymeric foam material to an extent such that a collapsed, polymeric foam material is formed that will re-expand upon contact with aqueous fluids.

37. The process of claim 30 wherein the process exhibits a mixing zone pressure drop of not more than about 50 psi.

38. The process of claim 37 wherein the process exhibits a mixing zone pressure drop of not more than about 40 psi.

39. The process of claim 38 wherein the process exhibits a mixing zone pressure drop of not more than about 30 psi.

* * * * *

UNITED STATES PATENT AND TRADEMARK OFFICE

CERTIFICATE OF CORRECTION

PATENT NO. : 5,827,909

DATED : October 27, 1998

INVENTOR(S) : Thomas A. DesMarais

It is certified that error appears in the above-identified patent and that said Letters Patent is hereby corrected as shown below:

Cover page of issued patent, under References Cited, U.S. PATENT DOCUMENTS, line 9, "Hag" should read -- Haq --.

Cover page of issued patent, under References Cited, U.S. PATENT DOCUMENTS, line 11, "4,611,914" should read -- 4,611,014 --.

Column 1, line 55, "Theological" should read -- rheological --.

Column 6, line 1, "petroleums," should read -- petrolatums, --.

Column 6, line 8, "di-isootanoates," should read -- di-isooctanoates, --.

Column 6, line 67, "diethyl-" should read -- dimethyl- --.

Column 16, line 57, "s from" should read -- from --.

Column 19, line 25, "polymerized-cured" should read -- polymerized/cured --.

Column 20, line 16, after "milk" insert -- , --.

Column 20, line 35, "HPE," should read -- HIPE, --.

Column 27, line 60, "1,3,7-octadiene," should read -- 1,3,7-octatriene, --.

Column 27, line 66, "2,7-methyl-" should read -- 2,7-dimethyl- --.

Column 28, lines 26-27, "trimethylolpropane" should read -- trimethyolpropane --.

Column 29, line 50, "comonomer," should read -- comonomer; --.

UNITED STATES PATENT AND TRADEMARK OFFICE

CERTIFICATE OF CORRECTION

PATENT NO. : 5,827,909

DATED : October 27, 1998

INVENTOR(S) : Thomas A. DesMarais

It is certified that error appears in the above-identified patent and that said Letters Patent is hereby corrected as shown below:

Column 30, line 47, after "step D)" insert -- , --.

Column 30, line 48, after "stream", first occurrence, insert -- , --.

Signed and Sealed this

Fourth Day of January, 2000

*Attest:*

*Attesting Officer*

*Acting Commissioner of Patents and Trademarks*